US010111177B2

United States Patent
Merlin et al.

(10) Patent No.: US 10,111,177 B2
(45) Date of Patent: Oct. 23, 2018

(54) UPLINK POWER CONTROL IN MULTI-USER UNLICENSED WIRELESS NETWORKS

(71) Applicant: QUALCOMM Incorporated, San Diego, CA (US)

(72) Inventors: Simone Merlin, San Diego, CA (US); Bin Tian, San Diego, CA (US); Gwendolyn Denise Barriac, Encinitas, CA (US); George Cherian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/969,530

(22) Filed: May 2, 2018

(65) Prior Publication Data

US 2018/0255517 A1 Sep. 6, 2018

Related U.S. Application Data

(63) Continuation of application No. 14/922,746, filed on Oct. 26, 2015, now Pat. No. 9,992,746.

(Continued)

(51) Int. Cl.
*H04W 52/10* (2009.01)
*H04W 52/14* (2009.01)
(Continued)

(52) U.S. Cl.
CPC ......... *H04W 52/10* (2013.01); *H04L 27/2601* (2013.01); *H04W 52/146* (2013.01);
(Continued)

(58) Field of Classification Search
CPC . H04W 52/10; H04W 52/146; H04W 52/242; H04W 52/245; H04W 52/54;
(Continued)

(56) References Cited

U.S. PATENT DOCUMENTS 8,447,343 B2* 5/2013 Gerstenberger ...... H04W 52/10
370/248
8,897,828 B2* 11/2014 Anderson ............. H04W 52/06
455/522

(Continued)

FOREIGN PATENT DOCUMENTS

WO WO2012005460 A2 1/2012

OTHER PUBLICATIONS

International Search Report and Written Opinion—PCT/US2015/057525—ISA/EPO—dated Feb. 5, 2016.

*Primary Examiner* — Duc C Ho
(74) *Attorney, Agent, or Firm* — Holland & Hart LLP

(57) ABSTRACT

Methods and systems of providing uplink (UL) transmission power control are provided. The UL transmission power control is provided between access points (APs) and wireless stations in a multi-user (MU) unlicensed wireless network. The disclosed method includes participating in a first wireless communication between an AP and at least one station of a plurality of stations in an unlicensed wireless network, and using an uplink UL transmission power parameter transmitted from the AP to the at least one station to regulate UL power control of UL transmissions between the at least one station and the AP.

30 Claims, 17 Drawing Sheets

Related U.S. Application Data

(60) Provisional application No. 62/069,766, filed on Oct. 28, 2014.

(51) Int. Cl.
  *H04W 52/24* (2009.01)
  *H04L 27/26* (2006.01)
  *H04W 52/54* (2009.01)
  *H04W 52/34* (2009.01)
  *H04W 84/12* (2009.01)

(52) U.S. Cl.
  CPC ....... *H04W 52/242* (2013.01); *H04W 52/245* (2013.01); *H04W 52/54* (2013.01); *H04W 52/346* (2013.01); *H04W 84/12* (2013.01)

(58) Field of Classification Search
  CPC .. H04W 52/346; H04W 84/12; H04L 27/2601
  See application file for complete search history.

(56) References Cited

U.S. PATENT DOCUMENTS

| | | |
|---|---|---|
| 2009/0003272 A1* | 1/2009 | Payne .................. H04W 24/08 370/329 |
| 2011/0077044 A1 | 3/2011 | Sampath et al. |
| 2012/0213189 A1 | 8/2012 | Choi et al. |
| 2013/0095748 A1 | 4/2013 | Hu et al. |
| 2013/0188540 A1 | 7/2013 | Yang et al. |
| 2013/0343288 A1 | 12/2013 | Ratasuk et al. |
| 2014/0071933 A1 | 3/2014 | Lee et al. |
| 2014/0099988 A1 | 4/2014 | Boppana et al. |
| 2014/0162718 A1* | 6/2014 | Li ....................... H04W 52/146 455/522 |
| 2014/0185481 A1 | 7/2014 | Seol et al. |
| 2015/0071081 A1 | 3/2015 | Gupta et al. |
| 2015/0141027 A1* | 5/2015 | Tsui ................... H04W 52/243 455/452.1 |
| 2015/0223178 A1 | 8/2015 | Pietraski et al. |
| 2015/0319700 A1 | 11/2015 | Oteri et al. |
| 2016/0100370 A1 | 4/2016 | Rong et al. |
| 2016/0119881 A1 | 4/2016 | Merlin et al. |

\* cited by examiner

UPLINK POWER CONTROL IN MULTI-USER UNLICENSED WIRELESS NETWORKS

CROSS REFERENCES

The present application for patent is a Continuation of U.S. patent application Ser. No. 14/922,746 by Merlin, et al., entitled "Uplink Power Control in Multi-User Unlicensed Wireless Networks," filed Oct. 26, 2015, which claims priority to U.S. Provisional Patent Application No. 62/069,766 by Merlin et al., entitled "Uplink Power Control in Multi-User Unlicensed Wireless Networks," filed Oct. 28, 2014, assigned to the assignee hereof, each of which is expressly incorporated by reference herein.

BACKGROUND

The present disclosure, for example, relates to wireless communication systems, and more particularly to regulating power of uplink transmissions in multi-user wireless network environments such as in orthogonal frequency-division multiple access (OFDMA) or multi-user (MU) multiple-input and multiple-output (MIMO) environments.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a Wireless Local Area Network (WLAN), such as a Wi-Fi network may include an access point (AP) that may communicate with one or more stations (STAs) or mobile devices. The AP may be coupled to a network, such as the Internet, and enable a mobile device to communicate via the network (and/or communicate with other devices coupled to the AP).

In certain wireless networks, the AP may be able to simultaneously communicate with multiple stations. These wireless networks are referred to herein as multi-user (MU) wireless networks. Generally, multi-user wireless networks are also able to communicate with individual stations, as in a single-user (SU) environment. However, when multiple users are present in an MU wireless network, the wireless network may be more sensitive to performance degradation issues than a typical SU environment. In particular, wireless networks employing modulation and coding schemes (MCSs) may find that performance degradation occurs in an MU environment unless uplink power is maintained within a predetermined range.

SUMMARY

Uplink (UL) power control in a multi-user wireless network may reduce performance degradation by ensuring that UL transmissions from multiple stations arrive at an AP having approximately the same AP received power (also referred to herein as AP RX power). This may be particularly beneficial in unlicensed wireless networks such as Wi-Fi networks. The UL power control can be performed in many different ways. Each option, however, involves the participation of an AP and at least one wireless station in a first wireless communication. As a result of this communication, the AP is enabled to determine an UL transmission power parameter that it may then transmit to the station. The UL transmission power parameter may be used to regulate either a transmission schedule or a power level of UL transmissions between the station and the AP. Thus, the UL transmission power parameter may provide information allowing the station to transmit its UL transmission at a same time as other stations whose transmissions arrive at the AP having approximately the same AP RX power. Alternatively, the UL transmission power parameter may provide information allowing the AP and station to participate in open loop power regulation, closed loop power regulation, or a hybrid of open and closed loop power regulation.

In a first illustrative embodiment, a method for wireless communication in a Wi-Fi system is disclosed. The method may include participating in a first wireless communication between an AP and at least one station of a plurality of stations in an unlicensed wireless network. The method may also include using an uplink (UL) transmission power parameter generated at the AP to regulate UL power control of UL transmissions between the at least one station and the AP, wherein UL power control refers to control of an UL transmission power from the at least one station.

In an aspect, the method may further include determining a UL path loss between the at least one station and the AP; and generating the UL transmission power parameter based at least in part on the UL path loss. In another aspect, the method may further include determining an uplink/downlink (UL/DL) path loss imbalance between the at least one station and the AP; and generating the UL transmission power parameter based at least in part on the UL/DL path loss imbalance. In yet another aspect, the method may further include transmitting the UL transmission power parameter in a trigger frame that triggers the UL transmissions between the at least one station and the AP. The method may additionally include transmitting the UL transmission power parameter in a power control frame that is separate from a trigger frame that triggers the UL transmissions between the at least one station and the AP. The step of participating in a first wireless communication may include communicating in an orthogonal frequency-division multiple access (OFDMA) or multi-user (MU) multiple-input and multiple-output (MIMO) environment.

In another aspect, the method may further include determining a received power for the UL transmissions between the at least one station and the AP, identifying other stations of the plurality of stations whose UL transmissions to the AP have received powers that are substantially the same as the received power for the at least one station, storing, as the UL transmission power parameter, an identification of the at least one station and the other stations having substantially the same received powers; and transmitting a trigger frame to the at least one station and the other stations identified by the UL transmission power parameter.

In yet another aspect, the method may include using open loop power control to regulate the power of UL transmissions between the at least one station and the AP. Additional steps of the method may include determining a target received power for UL transmissions from the at least one station to the AP, and using the UL transmission power parameter to convey the target received power and an AP transmission power to the at least one station. The method may further include receiving the UL transmissions from the at least one station at the target received power. Additionally, the method may include receiving, via the UL transmission power parameter, a target received power and an AP transmission power, determining a downlink (DL) path loss based on the AP transmission power, estimating a UL path loss from the at least one station to the AP based on the DL path loss, determining a UL transmission power for UL transmissions between the at least one station and the AP such that the UL transmissions arrive at the AP having the target received power and account for the UL path loss, and transmitting the UL transmissions using the UL transmission power.

In another aspect, the method may include using closed loop power control to regulate the power of UL transmissions between the at least one station and the AP. The method may further include determining a UL path loss between the at least one station and the AP, determining a target received power for UL transmissions from the at least one station to the AP, determining a UL transmission power for the UL transmissions from the at least one station to the AP that corresponds to the target received power, and using the UL transmission power parameter to convey the UL transmission power to the at least one station. The method may further include receiving the UL transmissions from the at least one station at the target received power. Additionally, the method may include transmitting, from the at least one station to the AP, a packet at a known transmit power such that the AP is enabled to determine a UL path loss between the at least one station and the AP. Also, the method may include receiving from the AP the UL transmission power parameter which includes an UL transmission power determined by the AP and accounting for the UL path loss determined by the AP, and transmitting the UL transmissions using the received UL transmission power.

In an additional aspect, the method may further include determining a UL path loss between the at least one station and the AP, determining a target received power for UL transmissions from the at least one station to the AP, and also determining the UL transmission power parameter based on the target received power for UL transmissions from the at least one station to the AP. The method may further include receiving the UL transmissions from the at least one station at the target received power. The method may also include transmitting to the at least one station and to other stations of the plurality of stations an indication that the UL transmission power parameter is applicable to the at least one station and the other stations. Additionally, the method may include adjusting the UL transmission power parameter as a function of the at least one station and the other stations. The method may also include adjusting the UL transmission power parameter in order to compensate for uplink/downlink (UL/DL) path loss imbalances between the at least one station or the other stations and the AP.

The step of determining the UL transmission power parameter may include determining a UL transmission power for the UL transmissions from the at least one station to the AP that corresponds to the target received power, wherein the UL transmission power accounts for UL path loss between the at least one station and the AP. Alternatively, the step of determining the UL transmission power parameter may include using a function defining a UL transmission power for the UL transmissions from the at least one station to the AP, wherein the function includes a downlink (DL) signal strength and the UL transmission power parameter. Further, the step of determining the UL transmission power parameter may include determining an offset value that indicates an amount by which a UL transmission power for the UL transmissions from the at least one station to the AP should be changed in order to correspond to the target received power.

In an aspect, the method may further include transmitting, from the at least one station to the AP, a packet at a known transmit power such that the AP is enabled to determine a UL path loss between the at least one station and the AP, receiving the UL transmission power parameter based on a target received power for UL transmissions determined by the AP based on the UL path loss, determining a received signal strength from a downlink (DL) frame received from the AP, determining a UL transmit power based on the received signal strength and the UL transmission power parameter, and transmitting UL transmissions to the AP using the determined UL transmit power.

In another aspect, the step of participating in the first wireless communication between the AP and the at least one station may include receiving a transmission from the at least one station to the AP, the transmission having a known power at which the transmission was sent from the at least one station or indicating a power at which the transmission was sent from the at least one station, determining a UL path loss between the at least one station and the AP, and generating the UL transmission power parameter based on the UL path loss. The method may further include requesting the transmission from the at least one station to the AP. The transmission may include a media access control (MAC) header or a wrapper frame in which the power at which the transmission was sent from the at least one station is indicated.

In a further aspect, the step of participating in the first wireless communication between the AP and the at least one station may include sending a transmission from the at least one station to the AP, the transmission having a known power at which the transmission was sent from the at least one station or indicating a power at which the transmission was sent from the at least one station. The transmission may be sent periodically. Sending the transmission may also include sending the transmission when an estimated beacon received signal strength indication (RSSI) changes more than a predetermined threshold amount with respect to a previous transmission between the at least one station and the AP. Sending the transmission may also include sending the transmission in response to a request by the AP.

In another aspect, the step of participating in the first wireless communication between the AP and the at least one station may include transmitting a downlink (DL) frame from the AP to the at least one station, receiving a UL frame from the at least one station, determining, based on the received UL frame, a UL/DL path loss imbalance between the at least one station and the AP, and generating the UL transmission power parameter based on the UL/DL path loss imbalance. The transmitting may include transmitting a path loss indication from the AP to the at least one station such that the at least one station is enabled to use the path loss indication in determining a transmission power of the UL frame. The transmitting may also include transmitting a transmission power of the UL frame from the AP to the at least one station such that the at least one station is enabled to transmit the UL frame using the transmission power of the UL frame. The DL frame may include a media access control (MAC) header, a wrapper frame, or a trigger frame that triggers the UL transmissions between the at least one station and the AP.

In yet another aspect, the step of participating in the first wireless communication between the AP and the at least one station may include transmitting a UL frame from the at least one station to the AP, receiving a downlink (DL) frame from the AP in response to the UL frame, determining, based on the received DL frame, a UL/DL path loss imbalance between the at least one station and the AP, and generating a UL transmission power based on the UL/DL path loss imbalance. The transmitting may include transmitting a path loss indication from the at least one station to the AP such that the AP is enabled to use the path loss indication in determining a DL transmission power of the DL frame. The transmitting may also include transmitting a desired transmission power of the DL frame from the at least one station to the AP such that the AP is enabled to transmit the DL frame using the desired transmission power of the DL frame. The UL transmission power parameter may be based at least in part on the first wireless communication.

In a second illustrative embodiment, an apparatus for wireless communication in a Wi-Fi system is disclosed. The apparatus may include a transceiver component for participating in a first wireless communication between an AP and at least one station of a plurality of stations in an unlicensed wireless network, and an uplink (UL) power control component for using an UL transmission power parameter generated at the AP to regulate UL power control of UL transmissions between the at least one station and the AP, wherein UL power control refers to control of an UL transmission power from the at least one station.

In an aspect, the apparatus may include a path loss estimation component. The path loss estimation component may be for determining a UL path loss between the at least one station and the AP, wherein the UL transmission power parameter is based at least in part on the UL path loss. The path loss estimation component may be for determining an uplink/downlink (UL/DL) path loss imbalance between the at least one station and the AP, wherein the UL transmission power parameter is based at least in part on the UL/DL path loss imbalance. The apparatus may also include a trigger frame component for transmitting the UL transmission power parameter in a trigger frame that triggers the UL transmissions between the at least one station and the AP. The apparatus may include a power control frame component for transmitting the UL transmission power parameter in a power control frame that is separate from a trigger frame that triggers the UL transmissions between the at least one station and the AP. The unlicensed wireless network may include an orthogonal frequency-division multiple access (OFDMA) or multi-user (MU) multiple-input and multiple-output (MIMO) environment.

In an aspect, the apparatus may further include a station grouping component for determining a received power for the UL transmissions between the at least one station and the AP, for identifying other stations of the plurality of stations whose UL transmissions to the AP have received powers that are substantially the same as the received power for the at least one station, and for storing, as the UL transmission power parameter, an identification of the at least one station and the other stations having substantially the same received powers. The apparatus may also include a trigger frame component for transmitting a trigger frame to the at least one station and the other stations identified by the UL transmission power parameter.

In an aspect, the apparatus may include a target AP receive (RX) power determination component for determining a target received power for UL transmissions from the at least one station to the AP, wherein the UL transmission power parameter is configured to convey the target received power and an AP transmission power to the at least one station.

In another aspect, the apparatus may further include a path loss estimation component for receiving, via the UL transmission power parameter, a target received power and an AP transmission power, for determining a downlink (DL) path loss based on the AP transmission power and for estimating a UL path loss from the at least one station to the AP based on the DL path loss. The apparatus may also include a station (STA) transmit (TX) power determination component for determining a UL transmission power for UL transmissions between the at least one station and the AP such that the UL transmissions arrive at the AP having the target received power and account for the UL path loss.

In another aspect, the apparatus may further include a path loss estimation component for determining a UL path loss between the at least one station and the AP, a target AP receive (RX) power determination component determining a target received power for UL transmissions from the at least one station to the AP, and a station (STA) transmit (TX) power determination component for determining a UL transmission power for the UL transmissions from the at least one station to the AP that corresponds to the target received power, wherein the UL transmission power parameter is configured to be used to convey the UL transmission power to the at least one station. The apparatus may further include a known power transmit (TX) component for transmitting, from the at least one station to the AP, a packet at a known transmit power such that the AP is enabled to determine a UL path loss between the at least one station and the AP.

In yet another aspect, the apparatus may further include a path loss estimation component for determining a UL path loss between the at least one station and the AP, a target AP receive (RX) power determination component for determining a target received power for UL transmissions from the at least one station to the AP, and a power control parameter determination component for determining the UL transmission power parameter based on the target received power for UL transmissions from the at least one station to the AP. The transceiver may be further configured for transmitting to the at least one station and to other stations of the plurality of stations an indication that the UL transmission power parameter is applicable to the at least one station and the other stations. The UL transmission power parameter may be a function of the at least one station and the other stations. The UL transmission power parameter may compensate for uplink/downlink (UL/DL) path loss imbalances between the at least one station or the other stations and the AP.

Additionally, the power control parameter determination component may be further configured for determining a UL transmission power for the UL transmissions from the at least one station to the AP that corresponds to the target received power, wherein the UL transmission power accounts for UL path loss between the at least one station and the AP. The power control parameter determination component may be further configured for using a function defining a UL transmission power for the UL transmissions from the at least one station to the AP, wherein the function includes a downlink (DL) signal strength and the UL transmission power parameter. The power control parameter determination component may be further configured for determining an offset value that indicates an amount by which a UL transmission power for the UL transmissions from the at least one station to the AP should be changed in order to correspond to the target received power.

In another aspect, the apparatus may further include a known power transmit (TX) component for transmitting, from the at least one station to the AP, a packet at a known transmit power such that the AP is enabled to determine a UL path loss between the at least one station and the AP. The apparatus may also include a station (STA) receive (RX) power determination component for receiving the UL transmission power parameter based on a target received power for UL transmissions determined by the AP based on the UL path loss and determining a received signal strength from a downlink (DL) frame received from the AP. A STA TX power component may also be included for determining a UL transmit power based on the received signal strength and the UL transmission power parameter.

In yet another aspect, the apparatus may include a path loss estimation component for receiving a transmission from the at least one station to the AP, the transmission having a known power at which the transmission was sent from the at least one station or indicating a power at which the transmission was sent from the at least one station, and determining a UL path loss between the at least one station and the AP. The apparatus may also include a power control parameter determination component for generating the UL transmission power parameter based on the UL path loss. The apparatus may further include a known power transmit (TX) component for sending a transmission from the at least one station to the AP, the transmission having a known power at which the transmission was sent from the at least one station or indicating a power at which the transmission was sent from the at least one station.

In another aspect, the apparatus may include a path loss estimation component for transmitting a downlink (DL) frame from the AP to the at least one station, receiving a UL frame from the at least one station, and determining, based on the received UL frame, a UL/DL path loss imbalance between the at least one station and the AP. The apparatus may also include a power control parameter determination component for generating the UL transmission power parameter based on the UL/DL path loss imbalance. The path loss estimation component may be further configured for transmitting a path loss indication from the AP to the at least one station such that the at least one station is enabled to use the path loss indication in determining a transmission power of the UL frame.

In an aspect, the apparatus may further include a path loss estimation component for transmitting a UL frame from the at least one station to the AP, receiving a downlink (DL) frame from the AP in response to the UL frame, and determining, based on the received DL frame, a UL/DL path loss imbalance between the at least one station and the AP. The apparatus may also include a station (STA) transmit (TX) power determination component for generating a UL transmission power based on the UL/DL path loss imbalance. The path loss estimation component may be further configured for transmitting a path loss indication from the at least one station to the AP such that the AP is enabled to use the path loss indication in determining a DL transmission power of the DL frame.

In a third illustrative embodiment, an apparatus for wireless communication in a Wi-Fi system is disclosed. The apparatus may include means for participating in a first wireless communication between an AP and at least one station of a plurality of stations in an unlicensed wireless network, and means for using an uplink (UL) transmission power parameter generated at the AP to regulate UL power control of UL transmissions between the at least one station and the AP, wherein UL power control refers to control of an UL transmission power from the at least one station.

In an aspect, the apparatus may further include means for determining a UL path loss between the at least one station and the AP, and means for generating the UL transmission power parameter based at least in part on the UL path loss. The apparatus may further include means for determining an uplink/downlink (UL/DL) path loss imbalance between the at least one station and the AP, and means for generating the UL transmission power parameter based at least in part on the UL/DL path loss imbalance. The apparatus may also include means for transmitting the UL transmission power parameter in a trigger frame that triggers the UL transmissions between the at least one station and the AP. The apparatus may also include means for transmitting the UL transmission power parameter in a power control frame that is separate from a trigger frame that triggers the UL transmissions between the at least one station and the AP.

In yet another illustrative embodiment, a non-transitory computer-readable medium storing computer-executable code for wireless communication in a Wi-Fi system is disclosed. The code of the non-transitory computer-readable medium may be executable by a processor to participate in a first wireless communication between an AP and at least one station of a plurality of stations in an unlicensed wireless network, and to use an uplink (UL) transmission power parameter generated at the AP to regulate UL power control of UL transmissions between the at least one station and the AP, wherein UL power control refers to control of an UL transmission power from the at least one station.

In an aspect, the non-transitory computer-readable medium may further include code executable by a processor to determine a UL path loss between the at least one station and the AP, and to generate the UL transmission power parameter based at least in part on the UL path loss. The non-transitory computer-readable medium may also include code executable by a processor to determine an uplink/downlink (UL/DL) path loss imbalance between the at least one station and the AP, and to generate the UL transmission power parameter based at least in part on the UL/DL path loss imbalance. The non-transitory computer-readable medium may additionally include code executable by a processor to transmit the UL transmission power parameter in a trigger frame that triggers the UL transmissions between the at least one station and the AP. The non-transitory computer-readable medium may further include code executable by a processor to transmit the UL transmission power parameter in a power control frame that is separate from a trigger frame that triggers the UL transmissions between the at least one station and the AP.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
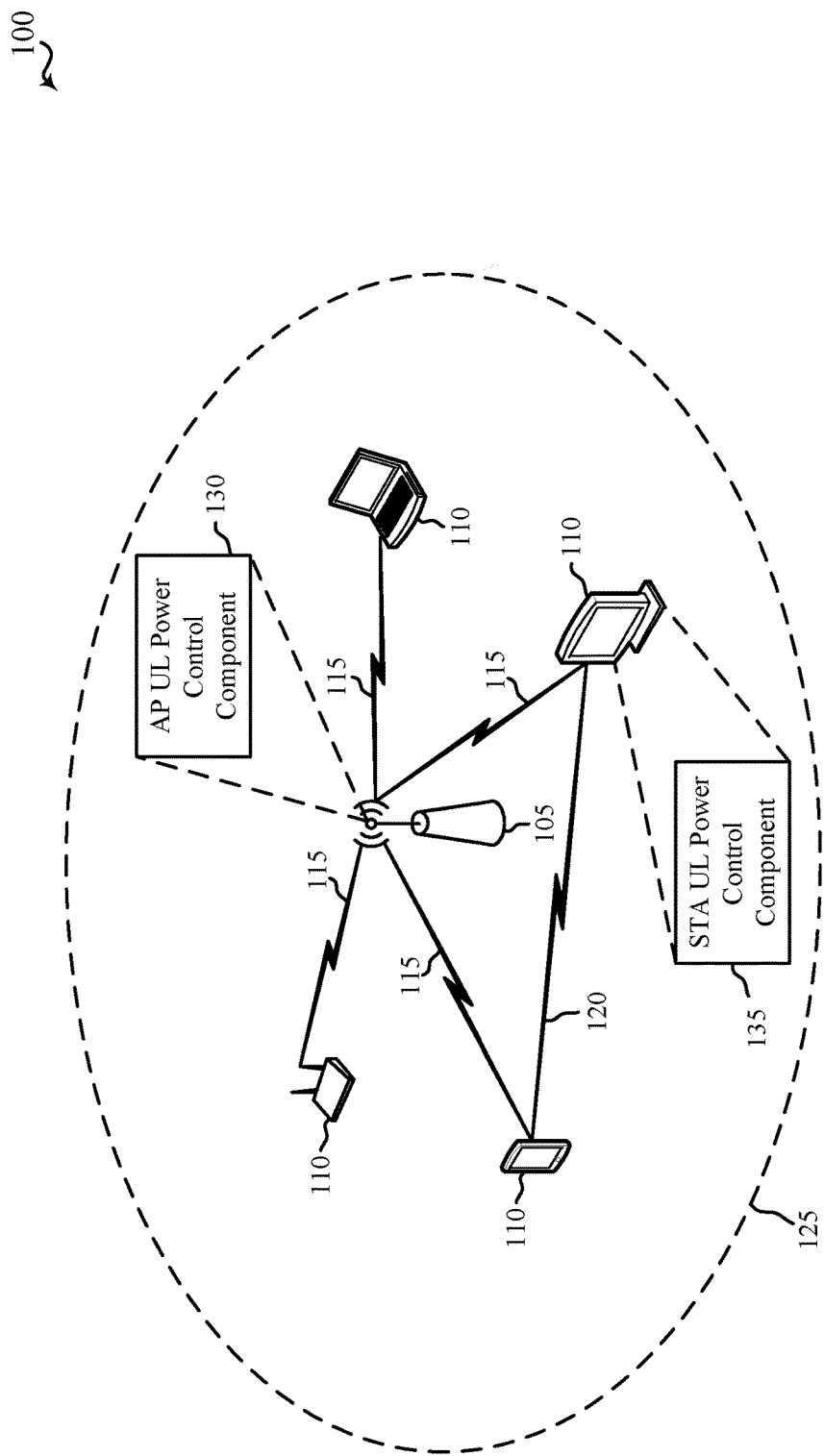
FIG. 1 shows a block diagram of a wireless communication system, in accordance with various aspects of the present disclosure.

In some instances, an access point (AP) may adjust its transmission power when communicating with a station (STA). This is generally referred to herein as power control. In particular, the disclosure below relates to power control in multi-user (MU) networks, such as Wi-Fi networks. In MU wireless networks, the AP may be able to simultaneously communicate with multiple stations. One example of an MU wireless network is an orthogonal frequency-division multiple access (OFDMA) environment. Another example is an MU multiple-input and multiple-output (MIMO) environment. In an OFDMA or MU MIMO environment, uplink (UL) transmissions from multiple wireless stations may be coordinated to arrive at an AP having a same or similar AP receive (RX) power. When the multiple UL transmissions have a same or approximately the same AP RX powers, performance degradation may be reduced or avoided. Thus, UL power control may be beneficial in these multi-user wireless networks, particularly in unlicensed wireless networks where UL power control has traditionally been limited.

The UL power control can be performed using various options. In one option, UL power control is limited to an AP coordinating a schedule so that stations whose AP RX power is approximately the same each perform their corresponding UL transmissions at approximately the same time. Thus, an AP may use an initial wireless communication in order to identify stations that are geographically close to each other or whose transmission (TX) powers result in similar AP RX powers. Then, the AP may transmit to the stations a UL transmission power parameter that indicates to the stations when the stations are to transmit their UL transmissions. In other options, the UL power control may be in the form of open or closed loop power control, or even a hybrid of open and closed loop power control. In each of these instances, the AP may participate in an initial wireless communication with a station and then convey to the station a UL transmission power parameter that provides information to the stations allowing them to adjust their station transmission (STA TX) power so that the AP RX power is at a regulated level. In these options, the UL transmission power parameter may include a determined STA TX power, a designated AP RX power, path loss information, etc.

Therefore, by use of UL power control in combination with a power control parameter, performance degradation may be limited. The UL power control ensures that UL transmissions from multiple wireless stations may be coordinated to arrive at an AP having a same or similar (within a predetermined tolerance) AP RX power. When the multiple UL transmissions have a same or approximately the same AP RX powers, performance degradation may be reduced or avoided.

The power control benefits discussed above and herein are distinguishable from power control used in cellular technologies. For example, cellular technologies may apply a closed loop power control. However, the closed loop power control used in cellular technologies could, if applied to a Wi-Fi scenario, result in an AP requiring constantly updated measurements of STA's pathloss. Once again, this may result in inefficiency in a Wi-Fi system. Therefore, the present disclosure provides a UL transmission power parameter that provides information to the STAs and allows the STAs to adjust their STA TX power. The benefits may be realized, as described below, through closed loop power control as well as through open loop power control and hybrid open-closed loop power control, as applied to Wi-Fi systems. The consideration of multiple power control options allows for the maximization of benefits. For example, in a closed loop power control, an AP may optimize STA grouping and provide a control parameter. The AP may further adjust the power of each STA through the power control parameter to compensate for any inaccuracies, including STA inaccuracy and UL/DL imbalance. If such compensation is unnecessary, the AP may communicate a single target for a group of STAs instead of for individual STAs. In an open loop power control, an STA may compute its TX power based on the measured DL signal strength from a DL frame. If a STA changes its position or its channel fades, then the DL signal strength may change and the TX power may be automatically adjusted. A hybrid approach may balance the benefits and consequences of both closed and open loop approaches. Cellular technologies, by contrast, do not disclose multiple power control options, nor do cellular technologies consider the addition of a power control parameter.

Prior techniques in Wi-Fi may apply power control in only limited ways. For example, past Wi-Fi methods and apparatuses may include an indicator from an AP that indicates to the STA the maximum power the STA is allowed to transmit. This maximum power may depend on a country's regulatory requirements, and may vary from country to country. Similarly, an indication from an AP to a STA may determine what the maximum allowed power is. Outside of these methods, prior techniques involving Wi-Fi do not contemplate power control.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring first to FIG. 1, a block diagram illustrates an example of a WLAN network 100. The WLAN network 100 may include an AP 105 and one or more wireless devices or stations (STAs) 110, such as mobile stations, personal digital assistants (PDAs), other handheld devices, netbooks, notebook computers, tablet computers, laptops, display devices (e.g., TVs, computer monitors, etc.), printers, etc. While only one AP 105 is illustrated, the WLAN network 100 may have multiple APs 105. Each of the wireless stations 110, which may also be referred to as mobile stations (MSs), mobile devices, access terminals (ATs), user equipment (UE), subscriber stations (SSs), or subscriber units, may associate and communicate with an AP 105 via a communication link 115. Each AP 105 has a geographic coverage area 125 such that wireless stations 110 within that area can typically communicate with the AP 105. The wireless stations 110 may be dispersed throughout the geographic coverage area 125. Each wireless station 110 may be stationary or mobile.

Although not shown in FIG. 1, a wireless station 110 can be covered by more than one AP 105 and can therefore associate with one or more APs 105 at different times. A single AP 105 and an associated set of stations may be referred to as a basic service set (BSS). An extended service set (ESS) is a set of connected BSSs. A distribution system (DS) (not shown) is used to connect APs 105 in an extended service set. A geographic coverage area 125 for an AP 105 may be divided into sectors making up only a portion of the coverage area (not shown). The WLAN network 100 may include APs 105 of different types (e.g., metropolitan area, home network, etc.), with varying sizes of coverage areas and overlapping coverage areas for different technologies. Although not shown, other wireless devices can communicate with the AP 105.

While the wireless stations 110 may communicate with each other through the AP 105 using communication links 115, each wireless station 110 may also communicate directly with one or more other wireless stations 110 via a direct wireless link 120. Two or more wireless stations 110 may communicate via a direct wireless link 120 when both wireless stations 110 are in the AP geographic coverage area 125 or when one or neither wireless station 110 is within the AP geographic coverage area 125 (not shown). Examples of direct wireless links 120 may include Wi-Fi Direct connections, connections established by using a Wi-Fi Tunneled Direct Link Setup (TDLS) link, and other P2P group connections. The wireless stations 110 in these examples may communicate according to the WLAN radio and baseband protocol including physical and MAC layers. In other implementations, other peer-to-peer connections and/or ad hoc networks may be implemented within WLAN network 100.

The WLAN network 100 may be a multi-user (MU) wireless network such as an orthogonal frequency-division multiple access (OFDMA) or multi-user (MU) multiple-input and multiple-output (MIMO) environment. Thus, in the WLAN network 100, some or all of the wireless stations 110 may simultaneously transmit messages to the AP 105. Therefore, in order to reduce performance degradation, UL transmissions to the AP 105 may be adjusted so as to arrive at the AP 105 having the same or approximately the same AP RX power. In certain examples, groups of wireless stations 110 may be organized to have similar AP RX powers. The grouping of wireless stations 110 and the UL power control for transmissions between the wireless stations 110 and the AP 105 may be coordinated using an AP UL power control component 130, which may, in one example, be a component of the AP 105. Some functions of the UL power control may also be performed using a STA UL power control component 135, which may be a component of one or more of the wireless stations 110. Additional details describing the AP UL power control component 130 and the STA UL power control component 135 are provided below.

The AP 105 and the wireless stations 110 may be used in methods and systems to provide UL power control. FIGS. 2A-2D illustrate communication diagrams representing various UL power control methods, as also further explained below.

Figure 2A:
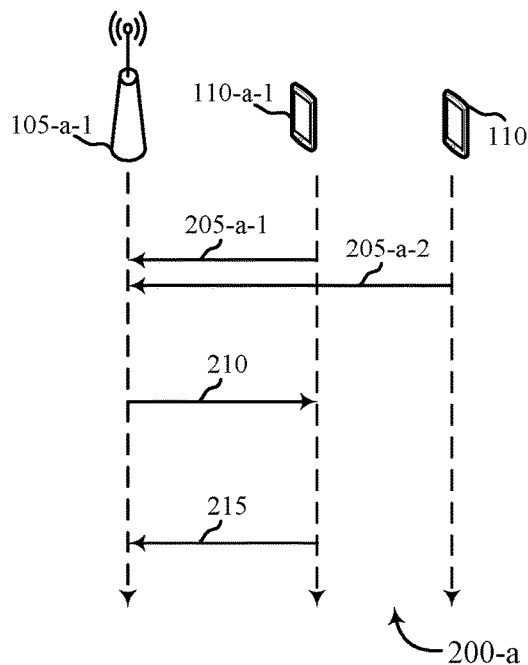
FIGS. 2A-2D show communication diagrams for providing uplink power control, in accordance with various aspects of the present disclosure.

FIG. 2A shows a communication diagram 200-a that illustrates a first option for providing UL power control. Communication diagram 200-a includes communications between an AP 105-a-1 and wireless station 110-a-1 and other wireless stations 110-n. AP 105-a-1 may be an example of AP 105 described above with respect to FIG. 1. Wireless station 110-a-1 and other wireless stations 110-n may be examples of the wireless stations 110 also described above with respect to FIG. 1. Communication diagram 200-a represents an UL power control option wherein the AP 105-a-1 determines AP RX power for each of many wireless stations 110 and then groups the wireless stations 110 accordingly. Thus, for example, in communication diagram 200-a, the wireless station 110-a-1 and other wireless stations 110-n each participate in a first communication 205-a-1, 205-a-2 with AP 105-a-1. The first communication 205-a-1, 205-a-2 may be any type of communication with AP 105-a-1 that allows AP 105-a-1 to determine an AP RX power for each of the wireless stations 110-a-1, 110-n. Once the AP 105-a-1 has determined the AP RX power for some or all of the wireless stations 110-a-1, 110-n, the AP 105-a-1 may group the wireless stations 110-a-1, 110-n based on the AP RX powers. Wireless stations 110 having similar AP RX powers are grouped together. The grouping may be stored at the AP 105-a-1 as a grouping parameter that may be used as a form of UL power control, as explained below.

In the option of FIG. 2A, the wireless stations 110-a-1, 110-n may not have to adapt their transmit power. Instead, the AP 105-a-1 may estimate the AP RX power based on the reception of frames sent by a wireless station 110-a-1, 110-n that uses the same transmit power the wireless stations 110-*a*-1, 110-*n* will use for UL MU MIMO/OFDMA communication. In one example the wireless stations 110-*a*-1, 110-*n* may use the same or similar transmit power for all transmissions. In another example the wireless stations 110-*a*-1, 110-*n* may indicate the transmit power used for transmitting the frame that then allows the AP 105-*a*-1 to estimate the AP RX power. The wireless stations 110-*a*-1, 110-*n* may also indicate the transmit power the wireless stations 110-*a*-1, 110-*n* will use for the data transmission in UL MU MIMO/OFDMA. The used transmit power may be communicated by the wireless stations 110-*a*-1, 110-*n* to the AP 105-*a*-1 and may be a function of the MCS used for the transmission. Wireless stations 110-*a*-1, 110-*n* having similar AP RX powers or similar UL MU MIMO/OFDMA powers may be grouped together, with this grouping being stored as a parameter that may be used by the AP 105-*a*-1. The AP 105-*a*-1 then transmits a message to the wireless stations 110 according to the grouping. For example, the AP 105-*a*-1 may transmit a trigger frame 210 (for example, a clear to transmit (CTX) frame) to only the wireless stations 110 in a particular group. In the communication diagram 200-*a*, wireless station 110-*a*-1 is the only wireless station 110 in its grouping. Thus, AP 105-*a*-1 transmits the trigger frame 210 to only wireless station 110-*a*-1. In other examples, multiple wireless stations 110 may be in the same grouping, where each would receive the trigger frame 210 from AP 105-*a*-1. The trigger frame 210 may indicate to each wireless station 110 that receives it that the wireless station 110 may transmit its UL transmission 215. Thus, each wireless station having a similar AP RX power may receive the trigger frame 210 and transmit an UL transmission 215. In the communication diagram 200-*a*, only the wireless station 110-*a*-1 transmits its UL transmission 215. Additionally, as will be explained below, other methods of communicating between the AP 105-*a*-1 and the wireless stations 110-*a*-1, 110-*n* may be used. For example, in addition to the trigger frame 210, the AP 105-*a*-1 may also transmit to the wireless stations 110-*a*-1, 110-*n* a power control frame that conveys UL power control information, as explained below.

The efficacy of this first UL power control option may be based on the degree of accuracy required for the UL power control. For example, with a 3.5 path loss exponent, a 3 dB difference may result in only a few meters difference in the geographic location of a wireless station 110. Thus, under this first option, finding compatible wireless stations 110 which may be grouped together may be challenging. Thus, this first option may be best suited to systems where a lower degree of accuracy is required, thus allowing channel variations and mobility to be tolerated without requiring frequent re-grouping. For example, this first option may be better suited for OFDMA instead of MU MIMO, as the tolerances in OFDMA may be larger than those for MU MIMO.

Figure 2B:
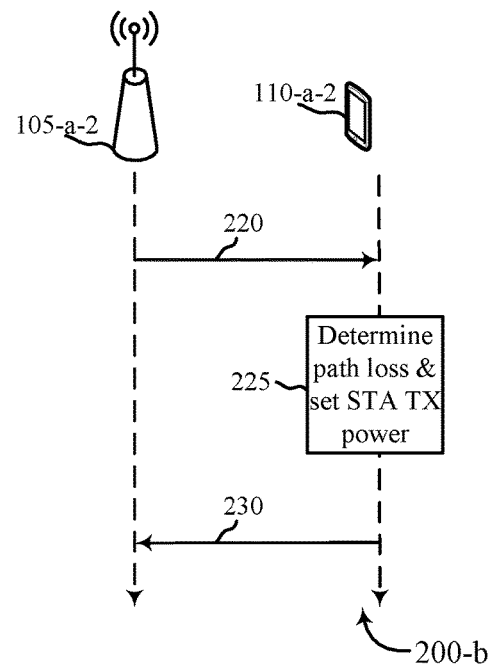

FIG. 2B shows a communication diagram 200-*b* that illustrates a second option for providing UL power control. Communication diagram 200-*b* includes communications between an AP 105-*a*-2 and a wireless station 110-*a*-2. AP 105-*a*-2 may be an example of AP 105 described above with respect to FIG. 1. Wireless station 110-*a*-2 may be an example of the wireless stations 110 also described above with respect to FIG. 1. Communication diagram 200-*b* represents an open loop UL power control option. In this open loop option, the AP 105-*a*-2 establishes a target AP RX power for the wireless station 110-*a*-2. When multiple wireless stations 110 are in communication with the AP 105-*a*-2, the AP 105-*a*-2 establishes this same target AP RX power for all of the wireless stations. The AP 105-*a*-2 then sends a message 220 to the wireless station 110-*a*-2 that includes the target AP RX power. As explained below, the message 220 may also include the AP TX power. The message 220 may be a beacon, an association response, a trigger frame soliciting UL transmissions from one or multiple wireless stations, or may be sent via a dedicated management frame. Additionally, in some examples, the target AP RX power may be set by a standard and thus be known to the wireless station 110-*a*-2 such that message 220 need not be sent.

Upon receiving the message 220 or upon learning the target AP RX power, the wireless station 110-*a*-2 may set its STA TX power (at block 225) so that the wireless station's UL transmission 230 may arrive at the AP 105-*a*-2 having the target AP RX power. Thus, in order to set its STA TX power accordingly, the wireless station 110-*a*-2 may determine a path loss (at block 225). To enable this, the AP 105-*a*-2 may include its AP TX power in the message 220. The wireless station 110-*a*-2 may compare the received AP TX power with an estimated station received (STA RX) power to determine the downlink (DL) path loss. The wireless station 110-*a*-2 may use the DL path loss to determine a UL path loss. For example, the wireless station 110-*a*-2 may assume that the DL and UL path losses are equal, or the wireless station 110-*a*-2 may use some other algorithm to determine the UL path loss from the DL path loss. The procedure for determining path loss at the wireless station 110-*a*-2 may be repeated periodically and may include consideration of aging factors to ensure a best possible estimation of path loss. Once the wireless station 110-*a*-2 has determined the UL path loss, the wireless station 110-*a*-2 may determine its STA TX power that will result in the reception of the target AP RX power at the AP 105-*a*-2. The wireless station 110-*a*-2 may transmit its UL transmission 230 using its determined STA TX power.

Figure 3A:
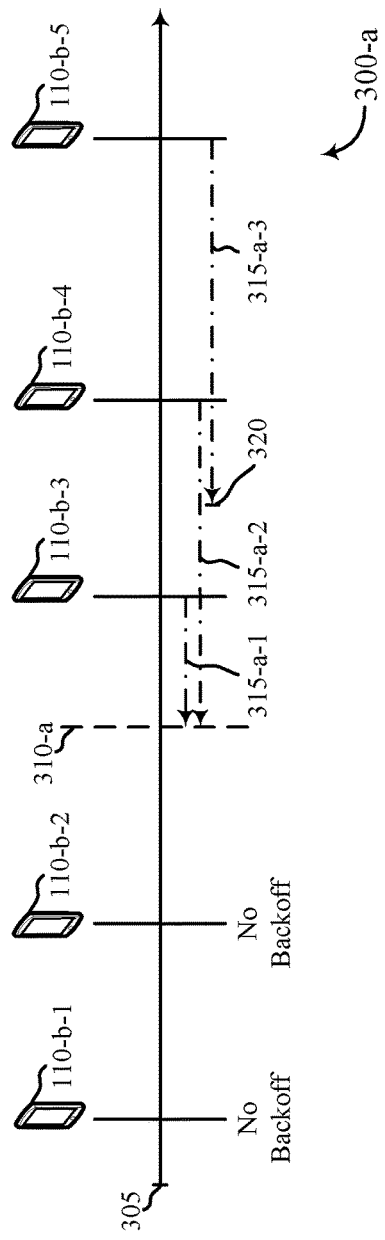
FIGS. 3A and 3B show UL power control results, in accordance with various aspects of the present disclosure.

The open loop option illustrated in communication diagram 200-*b* may be limited based on individual wireless station 110 capabilities. This is illustrated in FIG. 3A. FIG. 3A illustrates power control results diagram 300-*a* for use of the open loop UL power control option. FIG. 3A illustrates various wireless stations 110-*b*-1, 110-*b*-2, 110-*b*-3, 110-*b*-4, 110-*b*-5 that are in communication with an AP 105 (not shown). A wireless station 110 located at the AP 105 or that has no signal degradation would be located at point 305, at the far left of the illustrated scale. Wireless stations 110 that extend to the right on the scale are either increasingly further away from the AP 105 or have an increasingly degraded UL transmission (generally measured in dB). Thus, UL transmissions from wireless station 110-*b*-1 would have a higher decibel (less attenuation) than wireless station 110-*b*-5, located further away from AP 105. In power control results diagram 300-*a*, the AP 105 has established a target AP RX power 310-*a*. Thus, in the open loop UL power control option described with reference to FIG. 2B, the AP 105 will convey the target AP RX power 310-*a* to each of the wireless stations 110-*b*-1, 110-*b*-2, 110-*b*-3, 110-*b*-4, 110-*b*-5, and then each of the wireless stations 110-*b*-1, 110-*b*-2, 110-*b*-3, 110-*b*-4, 110-*b*-5 will attempt to adjust its STA TX power to achieve the received target AP RX power. In the example, wireless stations 110-*b*-1, 110-*b*-2 may be close enough to the AP 105 that no backoff (STA TX power increase) is necessary—these wireless stations are already transmitting at a power that should result in the target AP RX power requirement being met. However, wireless stations 110-*b*-3, 110-*b*-4, 110-*b*-5 will require some increase to their STA TX power in order to achieve the target AP RX power 310-*a*. For example, wireless station 110-*b*-3 must increase its STA TX power by a backoff amount 315-*a*-1. Wireless station 110-*b*-4 must increase its STA TX power by a backoff amount 315-*a*-2. Wireless station 110-*b*-5, however, suffers enough attenuation in its UL transmission that it must increase its STA TX power by a maximum backoff amount 315-*a*-3, resulting in an AP RX power 320 that is short of the target AP RX power 310-*a*. Thus, one drawback of the open loop UL power control approach is that some wireless stations may not be able to comply with the received target AP RX power.

Another disadvantage in use of the open loop UL power control option is that DL path loss and UL path loss may not be reciprocal. In those instances where the wireless station 110 assumes that the DL and UL path losses are equal, the assumption may result in errors when the actual path losses are not equal. Additional disadvantages include possible inaccuracies in the setting of STA TX power by individual wireless stations. Further, an AP 105 may not be able to correct individual wireless station errors or adapt the target AP RX power as a function of a group of wireless stations 110.

Figure 2C:
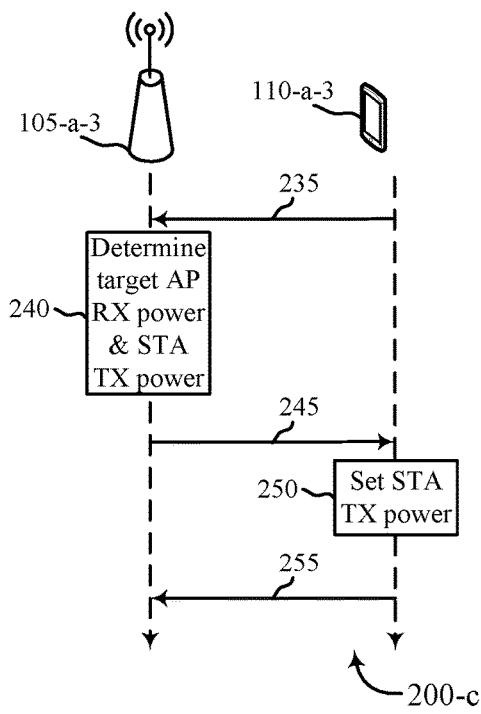

FIG. 2C shows a communication diagram 200-*c* that illustrates a third option for providing UL power control. Communication diagram 200-*c* includes communications between an AP 105-*a*-3 and a wireless station 110-*a*-3. AP 105-*a*-3 may be an example of AP 105 described above with respect to FIG. 1. Wireless station 110-*a*-3 may be an example of the wireless stations 110 also described above with respect to FIG. 1. Communication diagram 200-*c* represents a closed loop UL power control option. In this closed loop option, the AP 105-*a*-3 estimates a UL path loss from each wireless station 110, for example, wireless station 110-*a*-3. Thus, in order to do this, wireless station 110-*a*-3 transmits a packet 235 to the AP 105-*a*-3 at some known STA TX power. For example, the packet 235 may be sent at a declared maximum power which is known to the AP 105-*a*-3. Once the AP 105-*a*-3 receives the packet 235, the AP 105-*a*-3 can determine both a target AP RX power as well as the STA TX power required to achieve the target AP RX power (at block 240). The target AP RX power determined by the AP 105-*a*-3 may be selected based on a group of wireless stations 110—it need not be the same for all wireless stations 110. Thus, the target AP RX power may be selected so that it is achievable for all wireless stations 110 in the group.

Using the packet 235 transmitted at a known STA TX power, the AP 105-*a*-3 is also able to determine a UL path loss for the wireless station 110-*a*-3. Thus, the AP 105-*a*-3 can use its selected target AP RX power and the determined UL path loss to determine a STA TX power for the wireless station 110-*a*-3. The AP 105-*a*-3 communicates the STA TX power to the wireless station 110-*a*-3 via a message 245. For example, as described in more detail below, the STA TX power may be communicated in a trigger frame or in a power control frame. Once the wireless station 110-*a*-3 receives the STA TX power, the wireless station 110-*a*-3 adopts the received STA TX power (at block 250) and then transmits its UL transmissions 255 at the set STA TX power.

In the closed loop option, the AP 105-*a*-3 is in full control and can correct and inaccuracies arising from the wireless station 110-*a*-3. However, full accuracy may require the AP 105-*a*-3 to be constantly updated with current path loss measurements from each wireless station 110-*a*-3.

Figure 2D:
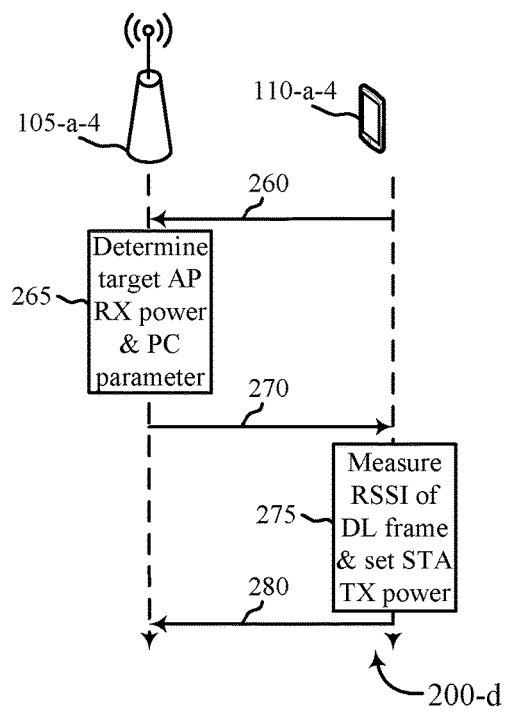

FIG. 2D shows a communication diagram 200-*d* that illustrates a fourth option for providing UL power control. Communication diagram 200-*d* includes communications between an AP 105-*a*-4 and a wireless station 110-*a*-4. AP 105-*a*-4 may be an example of AP 105 described above with respect to FIG. 1. Wireless station 110-*a*-4 may be an example of the wireless stations 110 also described above with respect to FIG. 1. Communication diagram 200-*d* represents a hybrid between the open loop option of FIG. 2B and the closed loop UL power control option of FIG. 2C. In the hybrid option, the AP 105-*a*-4 estimates a UL path loss from each wireless station 110, for example, wireless station 110-*a*-4. In one example, wireless station 110-*a*-4 transmits a packet 260 to the AP 105-*a*-4 at some known STA TX power. For example, the packet 260 may be sent at a declared maximum power which is known to the AP 105-*a*-4. Once the AP 105-*a*-4 receives the packet 260, the AP 105-*a*-4 can determine a target AP RX power (at block 265). The target AP RX power determined by the AP 105-*a*-4 may be selected based on a group of wireless stations 110—it need not be the same for all wireless stations 110. Thus, the target AP RX power may be selected so that it is achievable for all wireless stations 110 in the group.

Using the packet 260 transmitted at a known STA TX power, the AP 105-*a*-4 is also able to determine a power control (PC) parameter (at block 265). The PC parameter may include or indicate a STA TX power that corresponds to the target AP RX power. Alternatively, the PC parameter may include or indicate path loss or other information that may be used by the wireless station 110-*a*-4 as it sets its STA TX power. The AP 105-*a*-4 may adjust the PC parameter as a function of a group of wireless stations 110, and may also use the PC parameter to compensate for UL/DL path loss imbalance on a wireless station-by-wireless station basis. The PC parameter is described in greater detail below.

The AP 105-*a*-4 transmits a frame 270 to the wireless station 110-*a*-4 that indicates the group of wireless stations to which the frame or a portion of the frame may apply. The frame 270 may also include the determined PC parameter. For those wireless stations 110 to whom the frame 270 applies (for example, wireless station 110-*a*-4), the wireless station 110-*a*-4 is then enabled to determine its STA TX power. The wireless station 110-*a*-4 may determine its STA TX power based on the PC parameter sent by the AP 105-*a*-4 and also a signal strength (such as a received signal strength indicator (RSSI)) of a DL frame received from the AP 105-*a*-4 (at block 275). The wireless station 110-*a*-4 may monitor changes in the DL signal strength and may use these in connection with the PC parameter to set a STA TX power for UL transmissions 280.

Figure 3B:
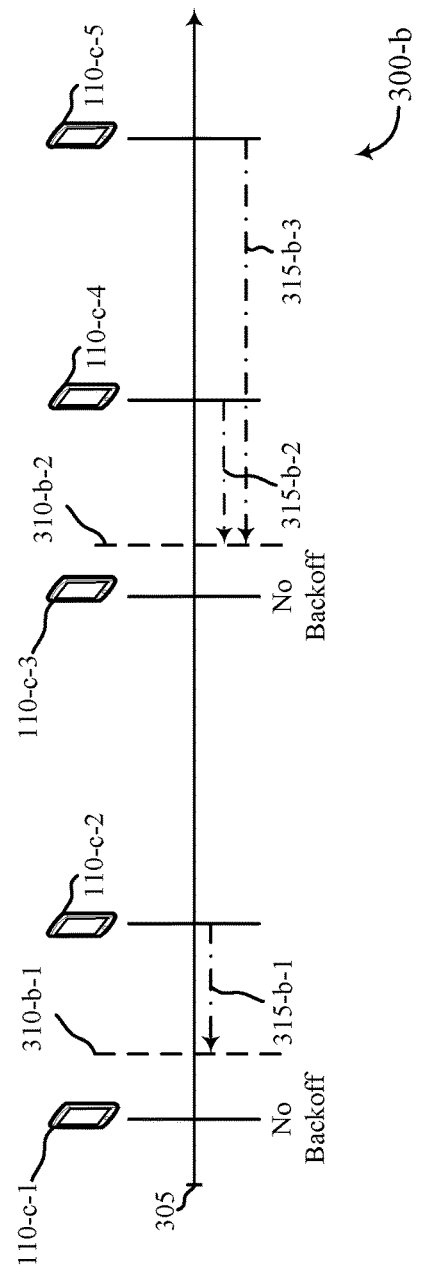

Thus, the hybrid option includes benefits realized by both the open loop and the closed loop UL power control options discussed in connection to FIGS. 2B and 2C and as illustrated in FIG. 3B. FIG. 3B illustrates power control results diagram 300-*b* for use of the hybrid UL power control option. FIG. 3B illustrates wireless stations 110-*c*-1, 110-*c*-2, 110-*c*-3, 110-*c*-4, 110-*c*-5. The wireless stations 110-*c*-1, 110-*c*-2, 110-*c*-3, 110-*c*-4, 110-*c*-5 are in communication with an AP 105 (not shown). A wireless station 110 located at the AP 105 or that has no signal degradation would be located at point 305, at the far left of the illustrated scale. Wireless stations 110 that extend to the right on the scale are either increasingly further away from the AP 105 or have an increasingly degraded UL transmission (generally measured in dB). Thus, UL transmissions from wireless station 110-*c*-1 would have a higher decibel (less attenuation) than wireless station 110-*c*-5, located further away from AP 105. In power control results diagram 300-*b*, the AP 105 has used the hybrid option to establish target AP RX powers that are appropriate and attainable by each of the wireless stations 110. For example, AP 105 has established a target AP RX power 310-*b*-1 which is achievable by wireless stations 110-*c*-1, 110-*c*-2. In order to attain the target AP RX power 310-*b*-1, wireless station 110-*c*-1 requires no backoff, while wireless station 110-*c*-2 requires a backoff amount 315-*b*-1 that is within its capabilities. Wireless stations 110-*c*-3, 110-*c*-4, 110-*c*-5 have been grouped separately and thus have received a different target AP RX power 310-*b*-2. For these wireless stations, wireless station 110-*c*-3 requires no backoff, while wireless stations 110-*c*-4, 110-*c*-5 each require a backoff amount 315-*b*-2, 315-*b*-3, respectively. Because the AP 105 can group the wireless stations and assign target AP RX powers accordingly, no wireless station 110 is subject to a maximum backoff amount that still fails to achieve the target AP RX power. In this way, the hybrid option includes many of the benefits of the closed loop option.

Additionally, the hybrid option allows the wireless stations 110 to determine their own STA TX power based on a measured DL signal strength. Thus, if the wireless station 110 changes its position (as a mobile device) or a channel fades, the wireless station 110 can detect any corresponding changes in the DL signal strength and adjust its STA TX power accordingly.

Thus, depending on the desired accuracy and power control needs in the WLAN network 100, each of the different UL power control options may be used. If highly accurate power control is required, the hybrid approach may be the most beneficial.

The hybrid approach includes the generation and use of a power control parameter which may be transmitted from an AP 105 to a wireless station 110. The power control parameter may be defined differently and include different variations of information.

Thus, for example, in one option, the power control parameter may include an absolute value of the STA TX power to be adopted by a wireless station 110. In this scenario, an AP 105 may determine a target AP RX power for transmissions from a particular wireless station 110. The determined target AP RX power may be a function of a group of wireless stations 110. The AP 105 may also determine a UL path loss from the wireless station or wireless stations 110 (for example, by receiving a communication from the wireless stations 110 at a known STA TX power). As long as the AP 105 knows the UL path loss for the wireless station 110, the AP 105 is enabled to determine the STA TX power that will result in the target AP RX power. The STA TX power is generally equal to the target AP RX power plus the UL path loss. Thus, the power control parameter may include the STA TX power, just as in the closed loop option.

In another option, the power control parameter may be used in conjunction with the measured DL signal strength to compute the STA TX power. To do this, a function may be defined that relates the STA TX power to both the DL signal strength and the power control parameter. Thus, STA TX power may be equal to F(DL signal strength, PC parameter). The function may be as simple as addition and subtraction, and may be defined in a standard so that it is known to the AP 105 and the wireless stations 110. In this option, the AP 105 determines the PC parameter based on the function F. The AP 105 also determines the target AP RX power and determines a UL path loss. Thus, the AP 105 is enabled to set the PC parameter such that F(DL signal strength, PC parameter) minus UL path loss is equal to the target AP RX power (since STA TX power is equal to the function F). If the function F is a simple addition or subtraction function, the PC parameter may be set as follows: PC parameter=target AP RX power−AP TX power+DL path loss−UL path loss. In some circumstances, the AP 105 may assume that UL and DL path loss are equal. Alternatively, the AP 105 may measure both path losses.

In either case, the AP 105 determines the PC parameter and transmits it to the wireless stations 110. The wireless stations 110 use the function F and their own measured DL signal strength to then determine the best STA TX power.

A third option for the power control parameter is to include an offset value in the power control parameter, relative to a previous STA TX power used by a wireless station 110. In this scenario, a wireless station 110 transmits a first transmission at a default power level. The default power level may be a maximum power, a power specified by the AP 105, a power specified by a standard, or a power computed using the function F, where the power control parameter may be a fixed value or a value fixed by a standard, or may be communicated to the wireless station 110 from the AP 105. Once the AP 105 receives the first transmission at the known power level, the AP may measure the AP RX power and compare this with a target AP RX power. If differences exist between the actual AP RX power and the target AP RX power, the AP 105 may indicate to the wireless station (in the form of the PC parameter) whether to increase or decrease the STA TX power by a certain amount.

In addition to different options for what is included in the PC parameter (in the hybrid UL power control option), transmission of the PC parameter from the AP 105 to the wireless stations 110 may also use various options.

Figure 4A:
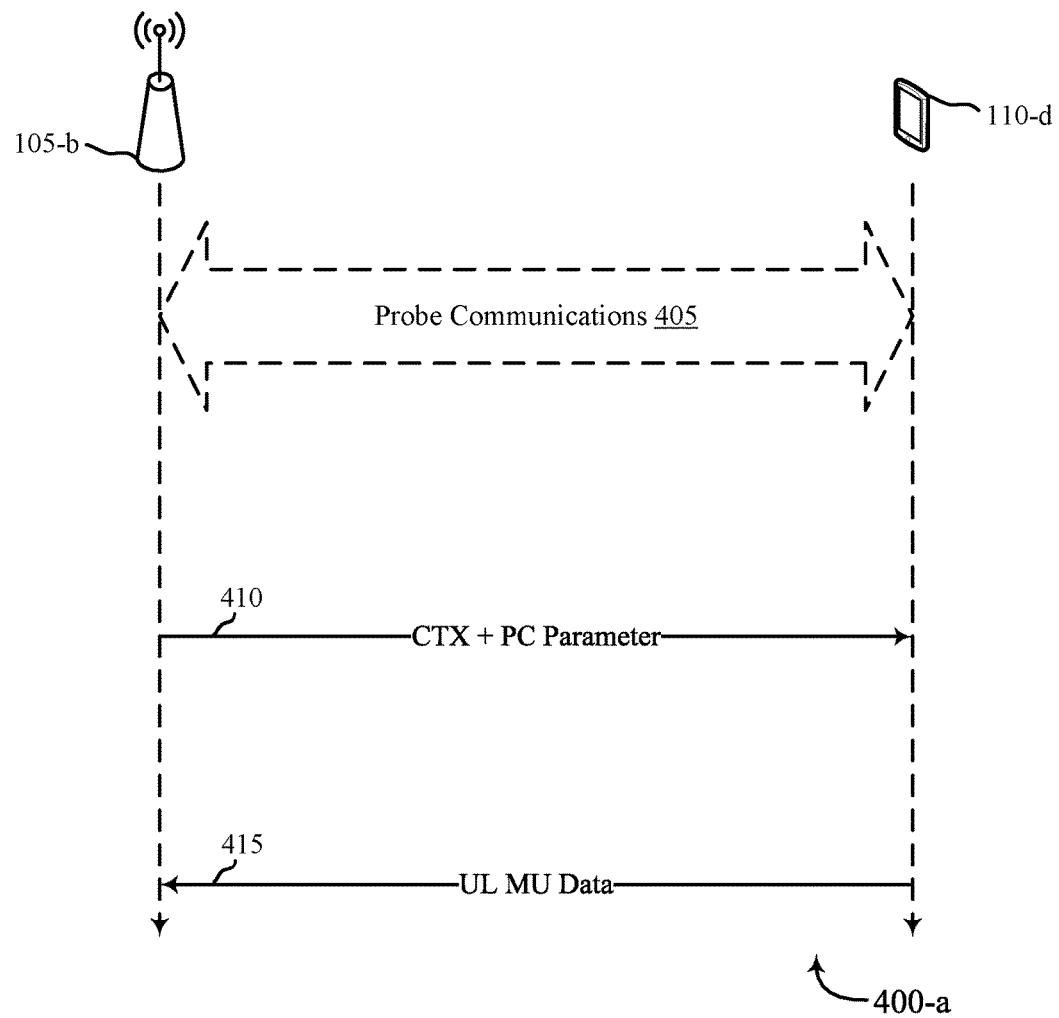
FIGS. 4A and 4B show communication diagrams for providing uplink power control, in accordance with various aspects of the present disclosure.

FIG. 4A illustrates a communication diagram 400-*a* for providing UL power control using a trigger frame. Communication diagram 400-*a* illustrates an AP 105-*b* and one or more wireless stations 110-*d*. The AP 105-*b* and the wireless stations 110-*d* may be examples of the AP 105 and wireless stations 110 of FIGS. 1 and 2D. Communication diagram 400-*a* shows that the AP 105-*b* and wireless stations 110-*d* first participate in probe communications 405. The probe communications 405 may include a probing phase to allow the AP 105-*b* to estimate a path loss for the wireless stations 110-*d*. The path loss estimation may be performed periodically and may be performed on a wireless station-by-station basis, as explained above. The probe communications 405 may also include a probing phase to estimate the UL/DL path loss imbalance. This estimation may also be performed periodically, and may be performed on a wireless station-by-station basis. Using the information gathered during the probe communications 405, the AP 105-*b* is able to group the wireless stations 110-*d* according to AP RX powers for each wireless station 110-*d*. The AP 105-*b* may also determine path loss amounts and correct UL/DL path loss imbalance, as explained in greater detail below. Using at least some of this determined information, the AP 105-*b* is enabled to generate a PC parameter for each of the wireless stations 110-*d*.

The PC parameters may be conveyed from the AP 105-*b* to the wireless stations 110-*d* via a trigger frame 410. The trigger frame 410 may also be referred to as a CTX frame. The trigger frame 410 is described in greater detail below. The wireless station 110-*d* receives the trigger frame 410 with its PC parameter and also may estimate the CTX RX power (in determining the DL signal strength). Using this information, the wireless station 110-*d* is enabled to set its STA TX power based on the CTX RX power and the PC parameter (which may account for path loss and path loss imbalance). Using the STA TX power, the wireless station 110-d transmits its UL MU data 415 to the AP 105-b.

Figure 4B:
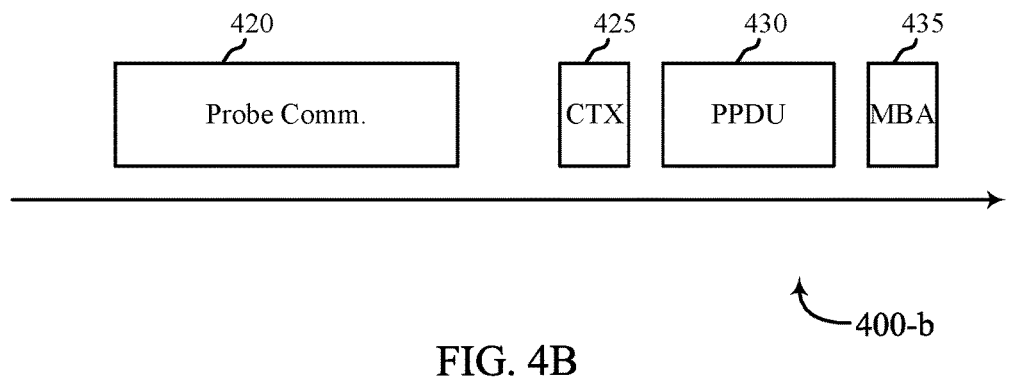

FIG. 4B illustrates a timeline 400-b for the communications illustrated in communication diagram 400-a. FIG. 4B illustrates that probe communications 420 between the AP 105-b and the wireless station 110-d occur first. These allow the AP 105-b to generate the PC parameter, which is transmitted to the wireless station 110-d via the CTX frame 425. The CTX frame 425 is a trigger frame and instructs the wireless station 110-d to transmit its UL transmissions in the form of a physical layer convergence procedure (PLCP) protocol data unit (PPDU) 430. Upon receipt of the PPDU 430 by the AP 105-b, the AP 105-b may transmit an acknowledgement via a multiple block acknowledgement (MBA) 435.

Figure 5A:
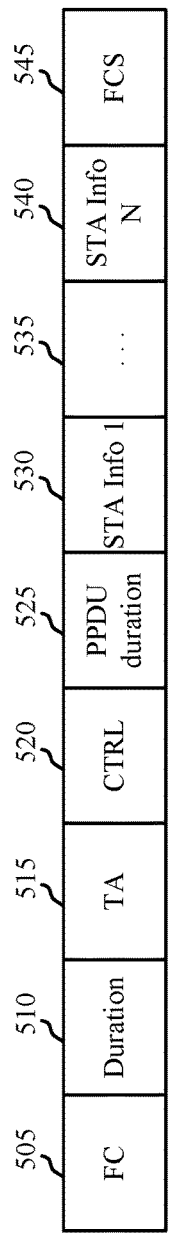
FIGS. 5A and 5B show a trigger frame for providing uplink power control, in accordance with various aspects of the present disclosure.

FIG. 5A is a block diagram of an example CTX frame 500-a structure that may be used to convey the PC parameter discussed above. The CTX frame 500-a may be used for UL power control on a group-by-group basis of wireless stations 110. Wireless station-by-station control may be performed using the CTX frame illustrated in FIG. 5B (discussed below). The CTX frame 500-a is a control frame that includes a frame control (FC) field 505, a duration field 510, a transmitter address (TA) field 515, a control (CTRL) field 520, a PPDU duration field 525, a first STA information (info) field 530, additional STA Info fields, 535, 540, and a frame check sequence (FCS) field 545. The FC field 505 indicates a control subtype or an extension subtype. The duration field 510 indicates to any receiver of the CTX frame 500-a to set the network allocation vector (NAV). The TA field 515 indicates the transmitter address. The CTRL field 520 is a generic field that may include information regarding the format of the remaining portion of the frame (e.g., the number of STA info fields and the presence or absence of any subfields within a STA info field). The CTRL field 520 may also indicate if the CTX frame 500-a is being used for UL MU MIMO or for UL OFDMA or both, indicating whether a Nss or Tone allocation field is present in the STA Info fields 530, 535, 540. The CTRL field 520 may also include the PC parameter for the group of wireless stations indicated by the STA Info fields 530, 535, 540. The CTRL field 520 may also include the AP TX power, if desired.

The PPDU duration field 525 indicates the duration of the following UL-MU-MIMO PPDU that the wireless stations 110 are allowed to send. The STA Info fields 530, 535, 540 contain information regarding a particular STA. The FCS field 545 indicates an FCS value used for error detection of the CTX frame 500-a.

Figure 5B:
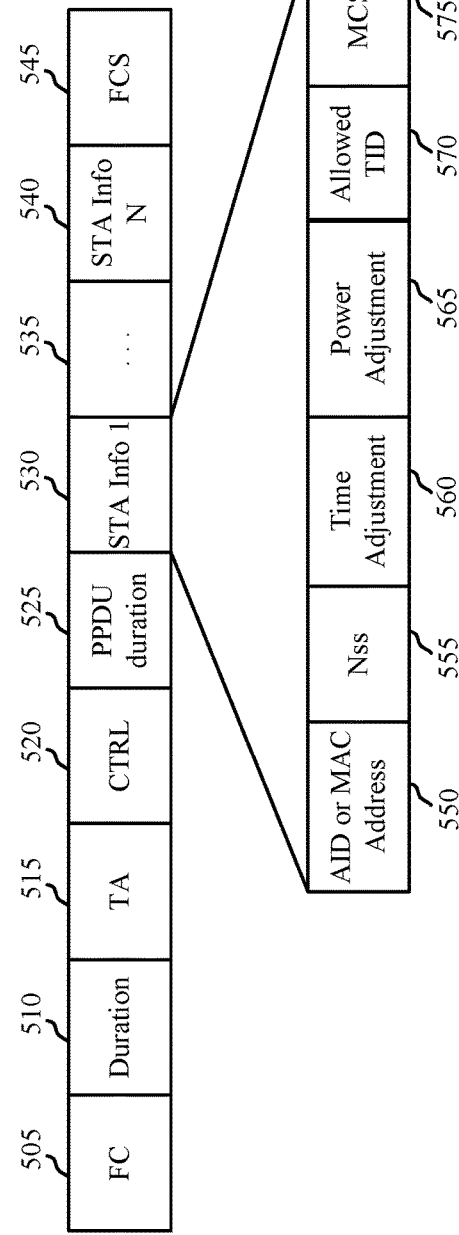

FIG. 5B is a block diagram of an example CTX frame 500-b structure that may be used to convey the PC parameter discussed above. The CTX frame 500-b may be used for UL power control on a per wireless station basis. The CTX frame 500-b is a control frame similar to that described above with respect to FIG. 5A, though CTX frame 500-b includes additional information or sub-fields in the STA Info fields 530, 535, 540. Additionally, instead of carrying the PC parameter in the CTRL field 520, the PC parameter is carried in each of the STA Info fields 530, 535, 540.

The STA Info fields 530, 535, 540 contain information regarding a particular STA and may include a per-STA (per wireless station 110) set of information. The STA Info fields 530, 535, 540 may each include an AID or MAC address field 550 which identifies a STA, a number of spatial streams (Nss) field 555 which indicates the number of spatial streams a STA may use (in an UL MU MIMO system), a time adjustment field 560 which indicates a time that a STA should adjust its transmission compared to the reception of a trigger frame (the CTX frame 500-b in this case), a power adjustment field 565 which indicates a power backoff a STA should take from a declared transmit power, an allowed TID 570 field which indicates a traffic identifier (TID), and an MCS field 575 which indicates the MCS the STA should use. The PC parameter may be included in the power adjustment field 565 or in other appropriate sub-fields of the STA Info fields 530, 535, 540.

Instead of using a trigger frame such as a CTX frame to provide the PC parameter and other information to the wireless stations 110, a less immediate control option may be used. Because a trigger frame is provided from an AP 105 to a wireless station 110 at the time that a UL transmission is expected, there may be timing concerns regarding the power control—whether there is sufficient time to determine the appropriate STA TX power. Or, alternatively, there may not be a need for fast or highly responsive power control. In these cases, the PC parameter may be sent from an AP 105 to a wireless station 110 a priori—in a control frame that is separate from the trigger frame. This separate power control frame may take the form of a special trigger frame or a management frame, for example. The power control frame may be provided on a group-by-group basis or for specific UL MU transmissions.

Figure 6A:
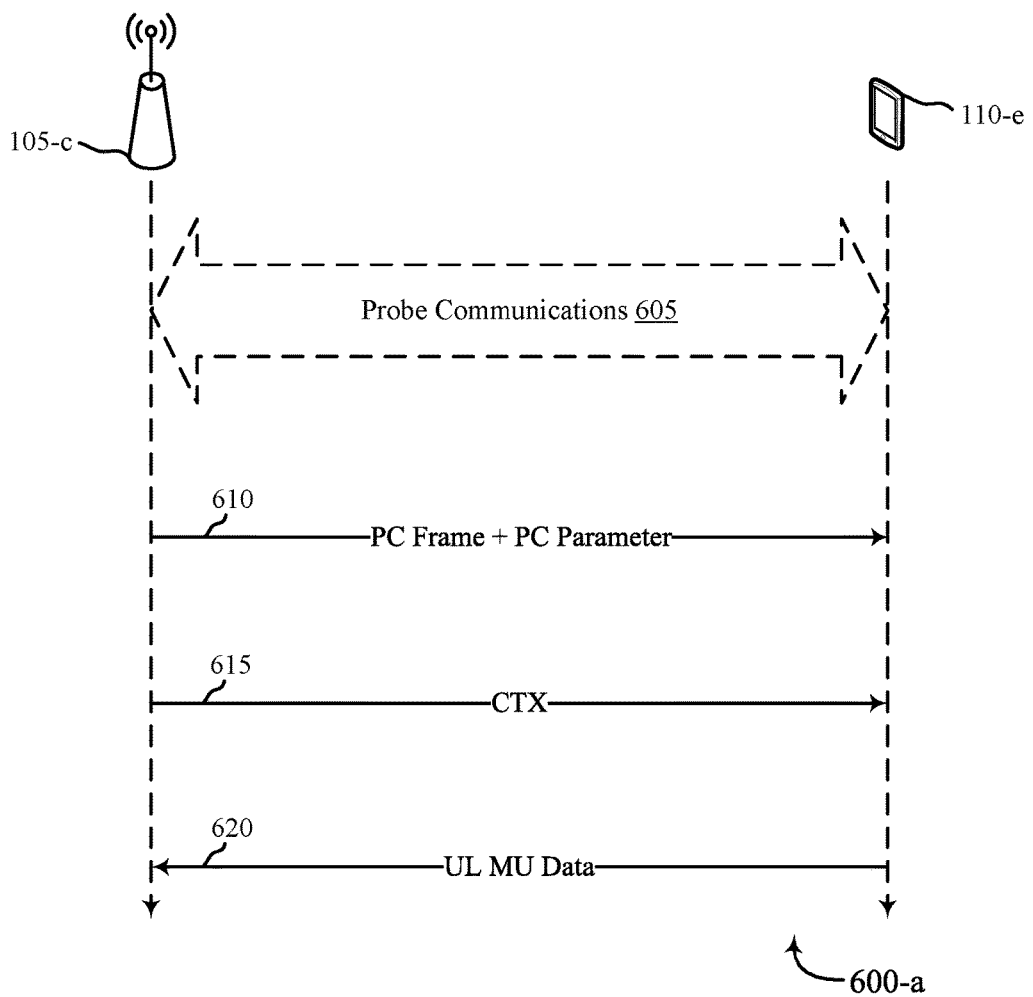
FIGS. 6A and 6B show communication diagrams for providing uplink power control, in accordance with various aspects of the present disclosure.

FIG. 6A illustrates a communication diagram 600-a for providing UL power control using a power control frame. Communication diagram 600-a illustrates an AP 105-c and one or more wireless stations 110-e. The AP 105-c and the wireless stations 110-e may be examples of the AP 105 and wireless stations 110 of FIGS. 1 and 2D. Communication diagram 600-a shows that the AP 105-c and wireless stations 110-e first participate in probe communications 605. The probe communications 605 may include a probing phase to allow the AP 105-c to estimate a path loss for the wireless stations 110-e. The path loss estimation may be performed periodically and may be performed on a wireless station-by-station basis, as explained above. The probe communications 605 may also include a probing phase to estimate the UL/DL path loss imbalance. This estimation may also be performed periodically, and may be performed on a wireless station-by-station basis. Using the information gathered during the probe communications 605, the AP 105-c is able to group the wireless stations 110-e according to AP RX powers for each wireless station 110-e. The AP 105-c may also determine path loss amounts and correct UL/DL path loss imbalance, as explained in greater detail below. Using at least some of this determined information, the AP 105-c is enabled to generate a PC parameter for each of the wireless stations 110-e.

The PC parameters may be conveyed from the AP 105-c to the wireless stations 110-e via a power control frame 610. The wireless station 110-e receives the power control frame 610 with its PC parameter and may use it (in combination with a measured DL signal strength) to determine its STA TX power for upcoming UL transmissions. At some time after transmission of the power control frame 610, the AP 105-c also transmits a trigger frame 615 to trigger the wireless stations 110-e to transmit their UL transmissions using the determined STA TX powers. Using the STA TX power, the wireless stations 110-e transmit UL MU data 620 to the AP 105-c.

Figure 6B:
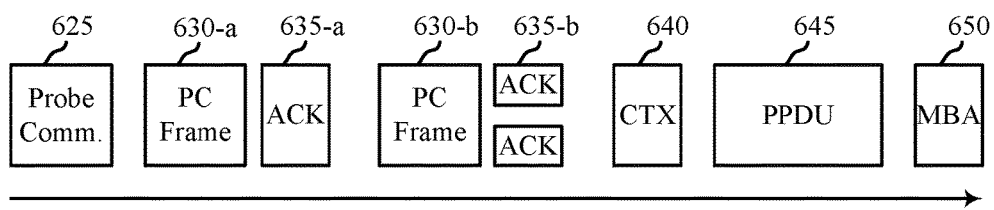

FIG. 6B illustrates a timeline 600-b for the communications illustrated in communication diagram 600-a. FIG. 6B illustrates that probe communications 625 between the AP 105-c and the wireless station 110-e occur first. These allow the AP 105-c to generate the PC parameter, which is transmitted to the wireless station 110-e via a PC frame 630-a or 630-*b*. PC frame 630-*a* may be used for a single wireless station 110-*e*, meaning that only one acknowledgement (ACK) 635-*a* is expected. PC frame 630-*b* may be used for multiple wireless stations 110-*e*, meaning that multiple ACKs 635-*b* are expected. At some time after the transmission of the PC frames 630, a CTX frame 640 is transmitted to the wireless stations 110-*e*. The CTX frame 640 is a trigger frame and instructs the wireless stations 110-*e* to transmit UL transmissions in the form of a PPDU 645. Upon receipt of the PPDU 645 by the AP 105-*c*, the AP 105-*c* may transmit an acknowledgement via an MBA 650.

Figure 7A:
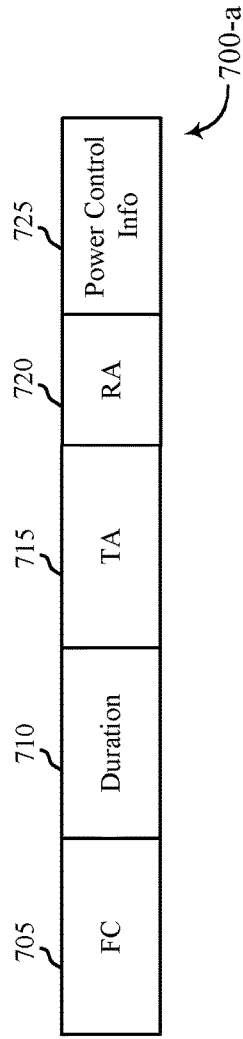
FIGS. 7A and 7B show a power control frame for providing uplink power control, in accordance with various aspects of the present disclosure.

FIG. 7A is a block diagram of an example power control frame 700-*a* structure that may be used to convey the PC parameter discussed above. The power control frame 700-*a* may be used for a single wireless station, and thus is an example of PC frame 630-*a* of FIG. 6B. The power control frame 700-*a* may include an FC field 705, a duration field 710, a TA field 715, a receiver address (RA) field 720, and a power control information field 725. The power control information field 725 may include the PC parameter and other related power control information that may be transmitted from the AP 105-*c* to the wireless stations 110-*e*.

Figure 7B:
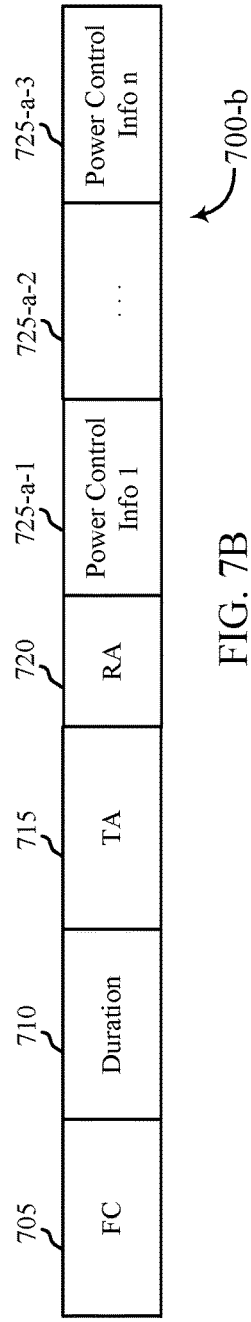

FIG. 7B illustrates an example of a power control frame 700-*b* structure that may be used to convey the PC parameter to multiple wireless stations 110-*e*. Thus, the power control frame 700-*b* is an example of PC frame 630-*b* of FIG. 6B. The power control frame 700-*b* is similar in structure to the power control frame 700-*a*, but includes multiple power control information fields 725-*a*-1, 725-*a*-2, 725-*a*-3.

A modified CTX frame may also be used in lieu of the power control frame. The modified CTX frame may be transmitted in advance just as the power control frame but may include in its CTRL field an indication that the CTX frame is only for power control and that only an ACK is requested—no UL data transmission is required. Similarly, an information element in a management frame may also be used to convey the PC parameter and other power control information from the AP 105-*c* to a wireless station 110-*e* in place of the power control frames illustrated in FIGS. 7A, 7B.

Figure 8:
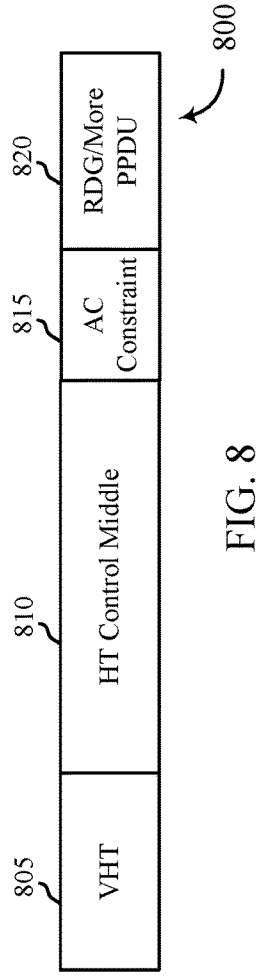
FIG. 8 shows a modified high-throughput control frame for providing uplink power control, in accordance with various aspects of the present disclosure.

Additional communication structures may also be used in other aspects of the open loop, closed loop or hybrid UL power control options. For example, in the closed loop and hybrid options, the AP 105 may be required to determine a UL path loss. This may be done by the transmittal of a packet from the wireless station 110 to the AP 105, as explained above in relation to FIGS. 2C, 2D. The packet is transmitted at a known power, thus enabling the AP 105 to determine the UL path loss. In one example, the known power may be indicated in the packet. Thus, and for example, the packet payload may carry the STA TX power for the packet. In this example, the packet could be of a multiplexed protocol data unit (MPDU) type, which may be aggregated with other frames. Alternatively, the packet could include a management frame containing an information element that may include the STA TX power for the packet. Alternatively, a new field may be included in a media access control (MAC) header or in a wrapper frame—a frame that wraps the MAC header—where the new field may include the STA TX power for the packet. One option would be to repurpose an existing field in the MAC header. For example, a MAC header may include a high throughput control (HTC) field. The HTC field may be repurposed to carry the power information conveyed to the AP 105. FIG. 8 illustrates an example of a modified HTC field 800. The modified HTC field 800 may include an HT control middle field 810, an access control (AC) constraint field 815 and a reverse direction grant (RDG)/More PPDU field 820. The HT control middle field 810 may include one or more reserved bits to redefine the meaning of later fields such as the AC constraint field 815 or the RDG/More PPDU field 820. These later fields may then carry the power information. In order to signal that the HT control middle field 810 is being used for a different purpose, a header such as a variant high throughput (VHT) field 805 may be used to indicate a variant of use.

In yet another option, the wireless station 110 could convey the known transmission power in a physical (PHY) layer header, such as in a high-efficiency (HE) signaling field (such as in HE SIG1, HE SIG2 or HE SIG3). In yet another option, instead of including the transmission power (for path loss determination) in the packet that is transmitted to the AP 105, the transmission power may be predetermined. In this case, the packet that is sent from the wireless station 110 to the AP 105 need only carry an indication that it was sent at the predetermined power.

The packet sent from the wireless station 110 to the AP 105 for purposes of allowing the AP 105 to determine a UL path loss may be unsolicited by the AP 105. For example, the packet may be sent periodically, or may be sent when an estimated beacon RSSI changes more than a threshold amount with respect to the last time the packet was sent. The amount of change that triggers the updated transmission may be predetermined as set by the AP 105 or in a standard. Alternatively, the packet may be solicited by the AP 105. The AP 105 could send a frame requesting that the wireless station 110 respond. The frame sent by the AP could be a net frame type, a management frame type with a power control request, or could be a MAC header with or without a wrapper frame carrying the power control request. A modified HTC field may be used as explained above.

One additional benefit of the hybrid UL power control option described above is the ability for either the AP 105 or the wireless station 110 to determine and compensate for any UL/DL path loss imbalance. These measurements may be performed by an AP 105 on a per wireless station basis by using SU PPDUs, as explained below. In certain cases, the same frame sent for the UL MU transmission may also be reused in determining the appropriate measurements. In addition, the correction may be both estimated and signaled by an AP 105, as well as estimated by a wireless station 110. FIGS. 9A-9D illustrate these options.

Figure 9A:
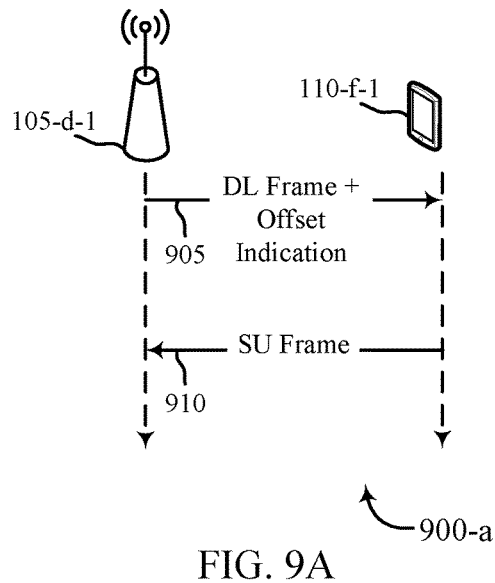
FIGS. 9A-9D show communication diagrams for determining uplink/downlink path loss imbalance, in accordance with various aspects of the present disclosure.

FIG. 9A illustrates a communication diagram 900-*a* that represents a per wireless station correction by an AP 105. Thus, communication diagram 900-*a* includes an AP 105-*d*-1 and a wireless station 1104-1. AP 105-*d*-1 and wireless station 1104-1 may be examples of the AP 105 and wireless stations 110 of FIGS. 1, 2D, 4A and 6A. In communication diagram 900-*a*, the AP 105-*d*-1 sends to the wireless station 1104-1 a DL frame 905 that also includes an offset indication. The offset indication may be some estimation by the AP 105-*d*-1 of a path loss compensation value. In one example, the offset indication may be the PC parameter discussed above. The wireless station 1104-1 uses the received offset indication and also measures the RSSI of the DL frame to determine its own STA TX power. The wireless station 1104-1 then uses the determined STA TX power to transmit a SU frame 910 to the AP 105-*d*-1. This process may be performed periodically for each wireless station 110-*f*-1 during, for example, the probe communications illustrated in FIGS. 4A and 6A.

If the SU frame 910 is received at the AP 105-*d*-1 at the expected AP RX power, then the AP 105-*d*-1 can be reassured that its offset indication was appropriate to compensate for a path loss or path loss imbalance. If, however, the SU frame 910 is received at an unexpected AP RX power, then the AP 105-*d*-1 is able to adjust its offset indication in order to compensate for the difference between the expected AP RX power and the actual AP RX power for the SU frame 910.

Figure 9B:
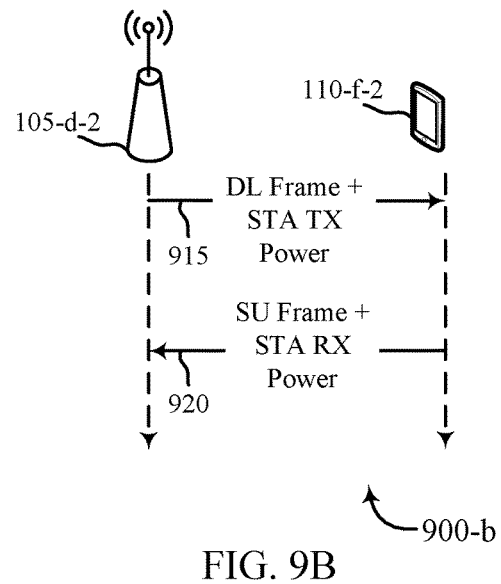

FIG. 9B illustrates a communication diagram 900-*b* that also represents a per wireless station correction by an AP 105. Communication diagram 900-*b* includes an AP 105-*d*-2 and a wireless station 1104-2. AP 105-*d*-2 and wireless station 1104-2 may be examples of the AP 105 and wireless stations 110 of FIGS. 1, 2D, 4A and 6A. In communication diagram 900-*b*, the AP 105-*d*-2 sends to the wireless station 110-*f*-2 a DL frame 915 that also includes a required STA TX power. The wireless station 110-*f*-2 uses the received STA TX power to transmit an SU frame 920 that includes the STA RX power for the received DL frame 915. Thus, the AP 105-*d*-2 will know its AP TX power for the DL frame 915, the STA RX power for the DL frame 915, the STA TX power for the SU frame 920 and the AP RX power for the SU frame 920. In this way, the AP 105-*d*-2 is enabled to determine both the DL and the UL path loss, and thus any UL/DL path loss imbalance.

Figure 9C:
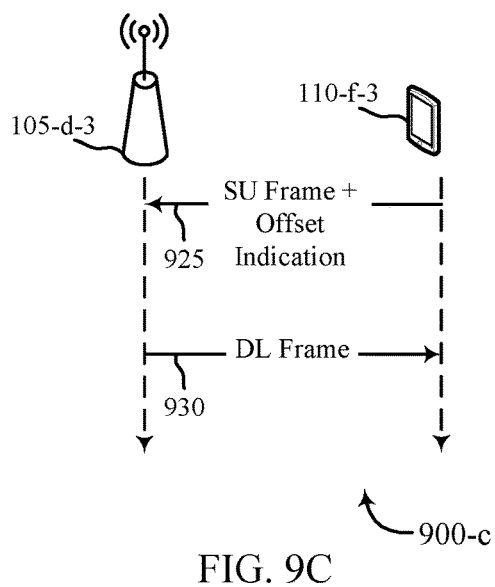

FIG. 9C illustrates a communication diagram 900-*c* that also represents a per wireless station correction by a wireless station 110. Communication diagram 900-*c* includes an AP 105-*d*-3 and a wireless station 110-*f*-3. AP 105-*d*-3 and wireless station 110-*f*-3 may be examples of the AP 105 and wireless stations 110 of FIGS. 1, 2D, 4A and 6A. In communication diagram 900-*c*, the wireless station 110-*d*-3 sends an SU frame 925 to the AP 105-*d*-3. The SU frame 925 also includes an offset indication determined by the wireless station 110-*f*-3. The offset indication may be some estimation by the wireless station 110-*f*-3 of a path loss compensation value. In one example, the offset indication may be the PC parameter discussed above. The AP 105-*d*-3 may use the received offset indication and also measures the RSSI of the SU frame 925 to determine its own AP TX power. The AP 105-*d*-3 then uses the determined AP TX power to transmit a DL frame 930 to the wireless station 110-*f*-3. This process may be performed periodically for each wireless station 110-*f*-3 during, for example, the probe communications illustrated in FIGS. 4A and 6A.

If the DL frame 930 is received at the wireless station 1104-3 at the expected STA RX power, then the wireless station 1104-3 can be reassured that its offset indication was appropriate to compensate for a path loss or path loss imbalance. If, however, the DL frame 930 is received at an unexpected STA RX power, then the wireless station 110-*f*-3 is able to adjust its offset indication in order to compensate for the difference between the expected STA RX power and the actual STA RX power for the DL frame 930.

Figure 9D:
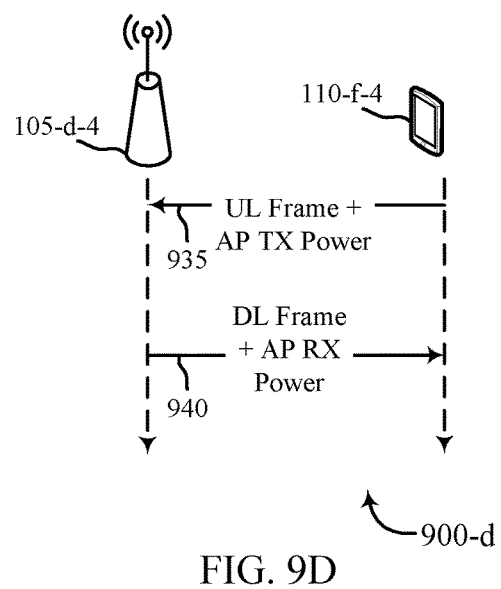

FIG. 9D illustrates a communication diagram 900-*d* that also represents a per wireless station correction by a wireless station 110. Communication diagram 900-*d* includes an AP 105-*d*-4 and a wireless station 1104-4. AP 105-*d*-4 and wireless station 1104-4 may be examples of the AP 105 and wireless stations 110 of FIGS. 1, 2D, 4A and 6A. In communication diagram 900-*d*, the wireless station 110-*f*-4 sends to the AP 105-*d*-4 a UL frame 935 that also includes a required AP TX power. The AP 105-*d*-4 uses the received AP TX power to transmit a DL frame 940 that includes the AP RX power for the received UL frame 935. Thus, the wireless station 1104-4 will know its STA TX power for the UL frame 935, the AP RX power for the UL frame 935, the AP TX power for the DL frame 940 and the STA RX power for the DL frame 940. In this way, the wireless station 110-*f*-4 is enabled to determine both the DL and the UL path loss, and thus any UL/DL path loss imbalance.

The signal exchanges illustrated in FIGS. 9A-9D may be implemented using different frame exchanges, including exchanges having an immediate response and exchanges having a non-immediate response.

Immediate response exchanges may be facilitated by using a control frame soliciting an immediate response. For example, the power control information may be included in an HTC field (for both DL and UL frames), and by redefining the content of the HTC field by reusing a reserved bit or combination of bits, as explained above with respect to FIG. 8. This method could also apply to request to send (RTS) messages, clear to send (CTS) messages, power save (PS) poll messages, ACK messages and block acknowledgement request/block acknowledgement (BAR/BA) signals, for example. As an alternative to using the HTC field, other control frame types may be developed or used.

As another example of an immediate response exchange, a data frame may be used and the power control information could added to the HTC field or to a new field in a MAC header. In this situation, the immediate response ACK or BA could carry the power control information in the HT control field. The power control information that may be included may include an identifier of the power control exchange (e.g., a sequence number), a TX power, a received power from a power control frame, or a power control parameter (as described above).

Exchanges with a non-immediate response option include using a management frame which includes the power control indications. In this case, the response could be a management frame carrying the power control information. Candidate management frames may include a new management type of frame or an action frame having a new power control information element. The management frame may be aggregated in an MPDU type with other frames (for example, an association request or response). The management frame may be a beacon or may be a trigger frame. Alternatively, a data frame may be used with power control information added to the HTC field or a new field in a MAC header. In this case a later UL frame may carry the power control information in the HTC field.

Because the exchange may not be immediate, the UL power control information may need to be related to the soliciting frame by an explicit indication. This could be done through several different ways. In one way, the type of signaling itself may indicate that it is a power control frame. For example, a DL frame may be implicitly defined by the protocol used for the DL frame (for example, a beacon). Alternatively, the frame carrying the UL power control information may also be marked with a timestamp of the DL frame, a sequence number of the DL frame, or the type of frame used for the DL frame. In any case, DL and UL frames may be individually acknowledged.

Figure 10A:
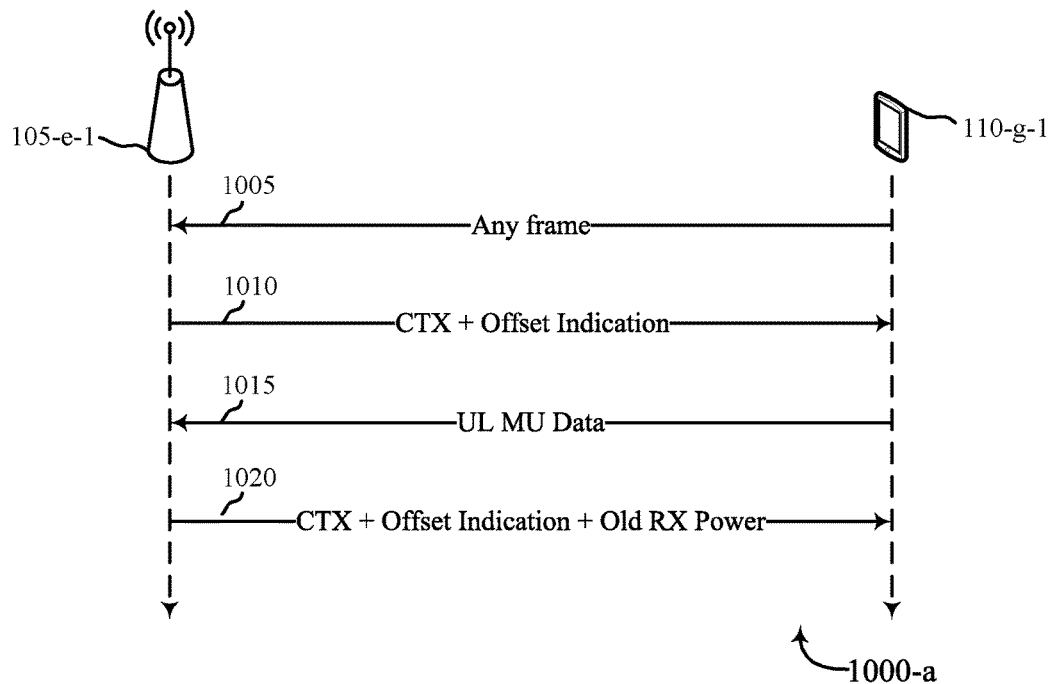
FIGS. 10A and 10B communication diagrams for determining uplink/downlink path loss imbalance, in accordance with various aspects of the present disclosure.
Figure 10B:
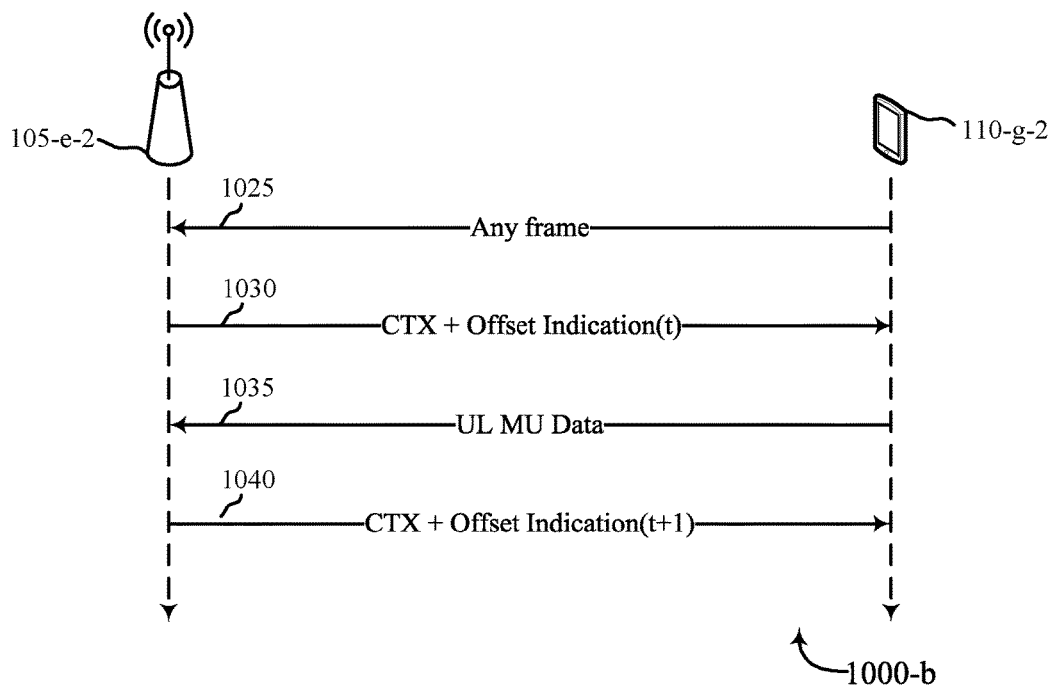

The exchanges described above in FIGS. 9A-9D may also be performed jointly with the UL MU transmission, as illustrated in FIGS. 10A and 10B. FIG. 10A, for example, illustrates a method of performing UL/DL path loss imbalance estimation by a wireless station using UL MU transmissions. Thus, the method of FIG. 10A relates to the methods illustrated in FIGS. 9C and 9D. FIG. 10B, on the other hand, illustrates a method of performing UL/DL path loss imbalance estimation by an AP using UL MU transmissions. Thus, the method of FIG. 10B relates to the methods illustrated in FIGS. 9A and 9B.

FIG. 10A includes a communication diagram 1000-*a* that illustrates communications between an AP 105-*e*-1 and wireless stations 110-*g*-1. The AP 105-*e*-1 and the wireless stations 110-*g*-1 may be examples of the AP 105 and the wireless stations 110 of FIG. 1, 2D, 4A, 6A, or 9A-9D. In diagram 1000-*a*, wireless station 110-*g*-1 initially transmits a frame 1005 (any type of frame may be used) to the AP 105-*e*-1. The frame 1005 is transmitted at any known STA TX power in accordance with the methods for sharing the known TX power with an AP 105 described above. The AP 105-*e*-1 uses the AP RX power for the received frame 1005 to group the wireless station 110-*g*-1 with other wireless stations having a similar AP RX power. The AP 105-*e*-1 may also determine an offset for each wireless station 110-*g*-1 that may be used by the wireless stations 110-*g*-1 to transmit a signal having the desired AP RX power. The AP 105-*e*-1 then transmits the offset indication and any grouping information in a CTX frame 1010 to the wireless station 110-*g*-1. The CTX frame 1010 is transmitted at an AP TX power that is known to the wireless station 110-*g*-1.

Using the received CTX frame 1010 with offset indication, the wireless station 110-*g*-1 is able to estimate the received CTX power and then set its STA TX power as a function of the received CTX power and the offset indication. Thus, the wireless station 110-*g*-1 is able to transmit its UL MU data 1015 using its calculated STA TX power. The AP 105-*e*-1 then receives the UL MU data 1015 and prepares a second CTX frame 1020 to transmit to the wireless station 110-*g*-1. The second CTX frame 1020 includes the same offset indication that was included in the initial CTX frame 1010 as well as the AP RX power of the UL MU data 1015. The second CTX frame 1020 is also transmitted at a AP TX power that is known to the wireless station 110-*g*. The wireless station 110-*g*-1 then uses the known STA RX and STA TX powers in addition to the known AP TX and AP RX powers to determine the any UL/DL path loss imbalance.

FIG. 10B includes a communication diagram 1000-*b* that illustrates communications between an AP 105-*e*-2 and wireless stations 110-*g*-2. The AP 105-*e*-2 and the wireless stations 110-*g*-2 may be examples of the AP 105 and the wireless stations 110 of FIG. 1, 2D, 4A, 6A, or 9A-9D. In diagram 1000-*b*, wireless station 110-*g*-2 initially transmits a frame 1025 (any type of frame may be used) to the AP 105-*e*-2. The frame 1025 is transmitted at any known STA TX power in accordance with the methods for sharing the known TX power with an AP 105 described above. The AP 105-*e*-2 uses the AP RX power for the received frame 1025 to group the wireless station 110-*g*-2 with other wireless stations having a similar AP RX power. The AP 105-*e*-2 may also determine an offset for each wireless station 110-*g*-2 that may be used by the wireless stations 110-*g*-2 to transmit a signal having the desired AP RX power. The AP 105-*e*-2 then transmits the offset indication and any grouping information in a CTX frame 1030 to the wireless station 110-*g*-2. The CTX frame 1030 is transmitted at an AP TX power that is not known to the wireless station 110-*g*-2.

Using the received CTX frame 1010 with offset indication, the wireless station 110-*g*-2 is able to estimate the received CTX power and then set its STA TX power as a function of the received CTX power and the offset indication. Thus, the wireless station 110-*g*-2 is able to transmit its UL MU data 1035 using its calculated STA TX power. The AP 105-*e*-2 then receives the UL MU data 1035 and prepares a second CTX frame 1040 to transmit to the wireless station 110-*g*-2. The second CTX frame 1040 includes an updated offset indication. The updated offset indication is determined by the AP 105-*e*-2 by comparing the target AP RX power with the actual AP RX power (of the UL MU data 1035). The second CTX frame 1040 is transmitted with the updated offset indication so that the wireless station 110-*g*-2 can accurately account for any UL/DL path loss imbalance.

Figure 11:
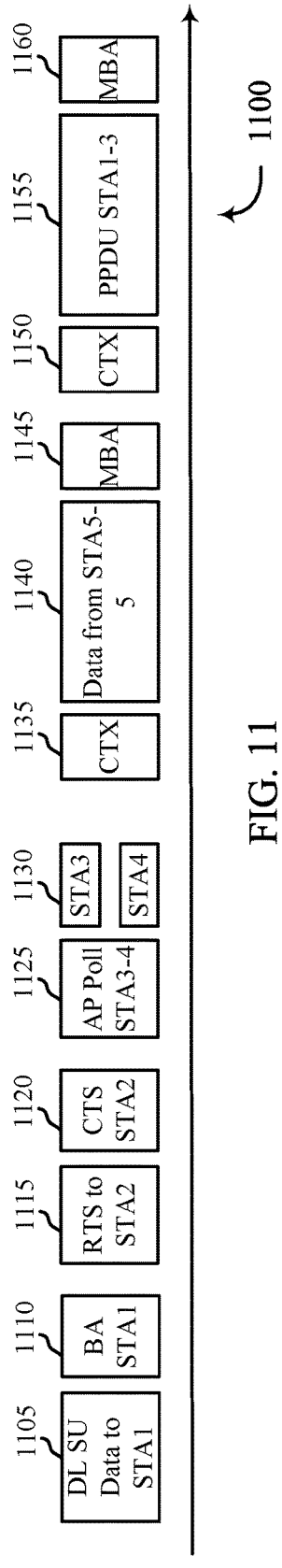
FIG. 11 shows a communication diagram for determining uplink/downlink path loss imbalance, in accordance with various aspects of the present disclosure.

FIG. 11 illustrates a summary (in the form of a communication timeline 1100) of some of the options for determining uplink/downlink path loss imbalance. The communication timeline 1100 includes a learning phase which may extend from block 1105 to block 1145. At block 1105, the AP 105 may transmit DL SU data to a wireless station (STA1). At block 1110, the wireless station STA1 transmits a block acknowledgment (BA) to the AP 105. The AP 105 may also transmit messaging to other wireless stations STA2, STA3, STA4 as well. At block 1115, the AP 105 transmits a request to send (RTS) to wireless station STA2. At block 1120, the wireless station STA2 responds with a clear to send (CTS) signal. At block 1125, the AP 105 polls wireless stations STA3, STA4. At block 1130, the wireless stations STA3, STA4 respond to the AP poll. Each of the messaging in blocks 1105, 1115, 1125 are intended to assist the AP 105 in learning information about the wireless stations STA1, STA2, STA3, STA4 so that the AP 105 can accurately generate a PC parameter or other offset indicator.

At block 1135, the AP 105 transmits a trigger or CTX frame to individual wireless station STA5. At block 1140, wireless station STA5 transmits data back to the AP 105, in accordance with any of the methods explained above. At block 1145, an MBA is returned to the wireless station STA5.

Additionally, at block 1150, the AP 105 transmits a trigger or CTX frame to multiple wireless stations STA1, STA2, STA3. In response, the wireless stations STA1, STA2, STA3 return a PPDU to the AP 105. An MBA 1160 is returned to the wireless stations STA1, STA2, STA3 acknowledging the received PPDUs.

In addition to the summary of operations illustrated in FIG. 11, additional setup signaling may occur—generally prior to the signaling described herein. For example, a wireless station 110 may inform an AP 105 of the wireless station's capabilities (in, for example, a capability information element), thus ensuring that the AP 105 understands those capabilities in advance of regulating power in UL transmissions of the wireless station 110. For example, the capability information element may include a maximum TX power of the wireless station 110, a minimum TX power of the wireless station 110, a minimum step of power adaptation the wireless station 110 is capable of, a tolerance of the wireless station's power control capability, or a map between the transmission MCS and the maximum output power. Additionally, an AP 105 may indicate the following information to a wireless station 110 (in advance of the signaling described herein): a requirement of power control to be admitted to UL MU operation (for example, a step of power control, etc.), or the AP's own maximum TX power and a map between the transmission MCS and the maximum output power (thus allowing wireless stations 110 to use any type of DL frame from the AP 105 to estimate the STA RX power).

Figure 12:
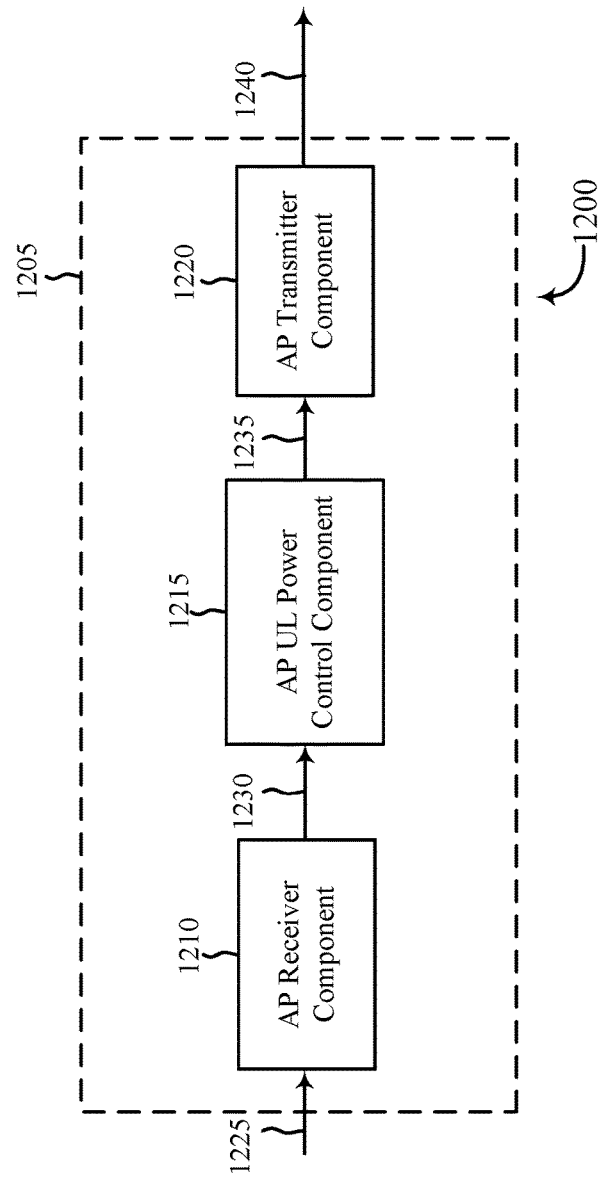
FIG. 12 shows a block diagram of a device configured for use in wireless communication, in accordance with various aspects of the present disclosure.

FIG. 12 shows a block diagram 1200 of a device 1205 for use in an AP for wireless communication, in accordance with various aspects of the present disclosure. The device 1205 may be an example of one or more aspects of an AP 105 described with reference to FIGS. 1, 2A-2D, 4A, 6A, 9A-9D, 10A, and 10B. The device 1205 may include an AP receiver component 1210, an AP UL power control component 1215, and/or an AP transmitter component 1220. The device 1205 may also be or include a processor (not shown). Each of these components may be in communication with each other.

The device 1205, through the AP receiver component 1210, the AP UL power control component 1215, and/or the AP transmitter component 1220, may be configured to perform functions described herein. For example, the device 1205 may be configured to provide UL transmission power control to wireless stations in a multi-user wireless network such as in OFDMA and MU MIMO environments.

The components of the device 1205 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each component may also be implemented, in whole or in part, with instructions embodied in a memory, formatted to be executed by one or more general or application-specific processors. The functions of each component may also be implemented as circuits or in circuitry.

The AP receiver component 1210 may receive information such as packets, user data, and/or control information associated with various information channels (e.g., control channels, data channels, etc.). The AP receiver component 1210 may be configured to receive various signals 1225 such as responses to probe communications, UL MU transmissions, SU or other UL frames. Information received may include power-related information sent from a wireless station, such as the STA TX power or a desired AP TX power. Information in the form of signals 1230 may be passed on to the AP UL power control component 1215, and to other components of the device 1205.

The AP UL power control component 1215 may be used by the device 1205 to provide various UL power control regulation for multiple wireless stations in an MU wireless network. For example, the AP UL power control component 1215 may be used to group wireless stations according to AP RX powers received at the device 1205. The AP UL power control component 1215 may also be used to determine target AP RX powers for UL transmissions from communicating wireless stations. Additionally, the AP UL power control component 1215 may be used to estimate path loss, and to determine STA TX power. Further, the AP UL power control component 1215 may generate a power control parameter, which may be transmitted to one or more wireless stations via a CTX frame or a power control frame, for example. The power control parameter and other power control information in the form of signals 1235 may be passed to the AP transmitter component 1220 for transmission to the wireless stations.

The AP transmitter component 1220 may transmit the one or more signals 1235 received from other components of the device 1205. The AP transmitter component 1220 may transmit power control signals 1240 in the form of CTX or power control frames, for example. The AP transmitter component 1220 may also transmit to the wireless stations other DL frames that include power control information. In some examples, the AP transmitter component 1220 may be collocated with the AP receiver component 1210 in a transceiver component.

Figure 13:
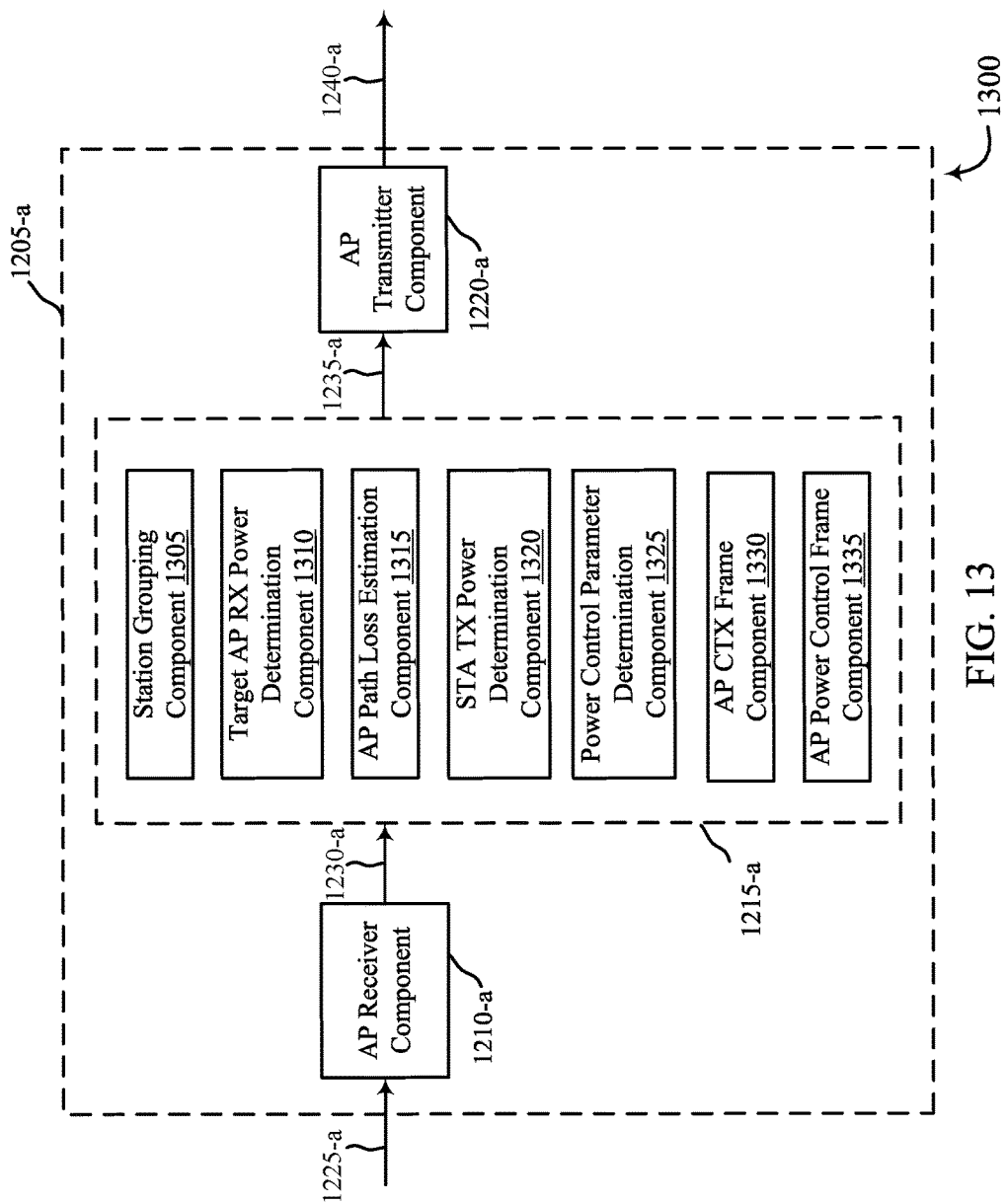
FIG. 13 shows a block diagram of a device configured for use in wireless communication, in accordance with various aspects of the present disclosure.

FIG. 13 shows a block diagram 1300 of a device 1205-a that is used in an AP for wireless communication, in accordance with various examples. The device 1205-a may be an example of one or more aspects of an AP 105 described with reference to FIGS. 1, 2A-2D, 4A, 6A, 9A-9D, 10A, and 10B. It may also be an example of a device 1205 described with reference to FIG. 12. The device 1205-a may include an AP receiver component 1210-a, an AP UL power control component 1215-a, and/or an AP transmitter component 1220-a, which may be examples of the corresponding components of device 1205. The AP receiver component 1210-a may receive signals 1225-a such as responses to probe communications, UL MU transmissions, SU or other UL frames. The AP receiver component 1210-a may convey power-related information received in the signals 1225-a to the AP UL power control component 1215-a via signals 1230-a. Power control information generated by the AP UL power control component 1215-a may be transmitted to the AP transmitter component 1220-a via signals 1235-a. The AP transmitter component 1220-a may transmit the power control information to wireless stations via signals 1240-a that may include CTX or power control frames, for example. The device 1205-a may also include a processor (not shown). Each of these components may be in communication with each other. The AP UL power control component 1215-a may include a station grouping component 1305, a target AP RX power determination component 1310, an AP path loss estimation component 1315, a STA TX power determination component 1320, a power control parameter determination component 1325, an AP CTX frame component 1330, and an AP power control frame component 1335. The AP receiver component 1210-a and the AP transmitter component 1220-a may perform the functions of the AP receiver component 1210 and the AP transmitter component 1220, of FIG. 12, respectively.

The station grouping component 1305 may be used by the device 1205-a to determine groupings of wireless stations based on AP RX powers of UL transmissions from the wireless stations. For example, the station grouping component 1305 may coordinate the probing and the receipt of UL transmissions from one or more wireless stations. The station grouping component 1305 may then group the communicating wireless stations based on those stations having similar AP RX powers. The station grouping component 1305 may then coordinate the transmission of CTX frames to the wireless stations in each group such that the wireless stations having the same or similar AP RX powers are triggered to communicate with the device 1205-a at a same time.

The target AP RX power determination component 1310 may be used by the device 1205-a to determine a target AP RX power for one or more wireless stations. In order to facilitate many different wireless stations having different AP RX powers and maximum backoff limits, the target AP RX power determination component 1310 may determine several different target AP RX powers such that each wireless station in communication with the device 1205-a is enabled to transmit at one of the target AP RX powers.

The AP path loss estimation component 1315 may be used by the device 1205-a to estimate either a UL or a DL path loss between the device 1205-a and one or more wireless stations. The AP path loss estimation component 1315 may use knowledge of one or more of an AP TX power, an AP RX power, a STA TX power and a STA RX power to determine both a UL and DL path loss as well as and UL/DL path loss imbalance.

The STA TX power determination component 1320 may be used to determine a STA TX power for one or more wireless stations that will result in one or more of the AP RX powers (determined by the target AP RX power determination component 1310). The STA TX power determination component 1320 may consider UL path loss and target AP RX power in determining a STA TX power for a given wireless station.

The power control parameter determination component 1325 may be used to determine a power control parameter that may be transmitted to one or more wireless stations. As explained above, the power control parameter may be an absolute STA TX power, a value representing a differential STA TX power, or a value that is a component of a function F that describes the STA TX power. The power control parameter determination component 1325 may insert the generated power control parameter into either a CTX or a power control frame for transmission to a wireless station.

The AP CTX frame component 1330 may be used by the device 1205-a to create a CTX frame that includes a power control parameter or other power control information, as generated by one or more of the components 1305-1325. Similarly, the AP power control frame component 1335 may be used to create a power control frame that includes a power control parameter or other power control information, as generated by one or more of the components 1305-1325. Each of the CTX or power control frames may be transmitted to the wireless stations using the AP transmitter component 1220-a.

Figure 14:
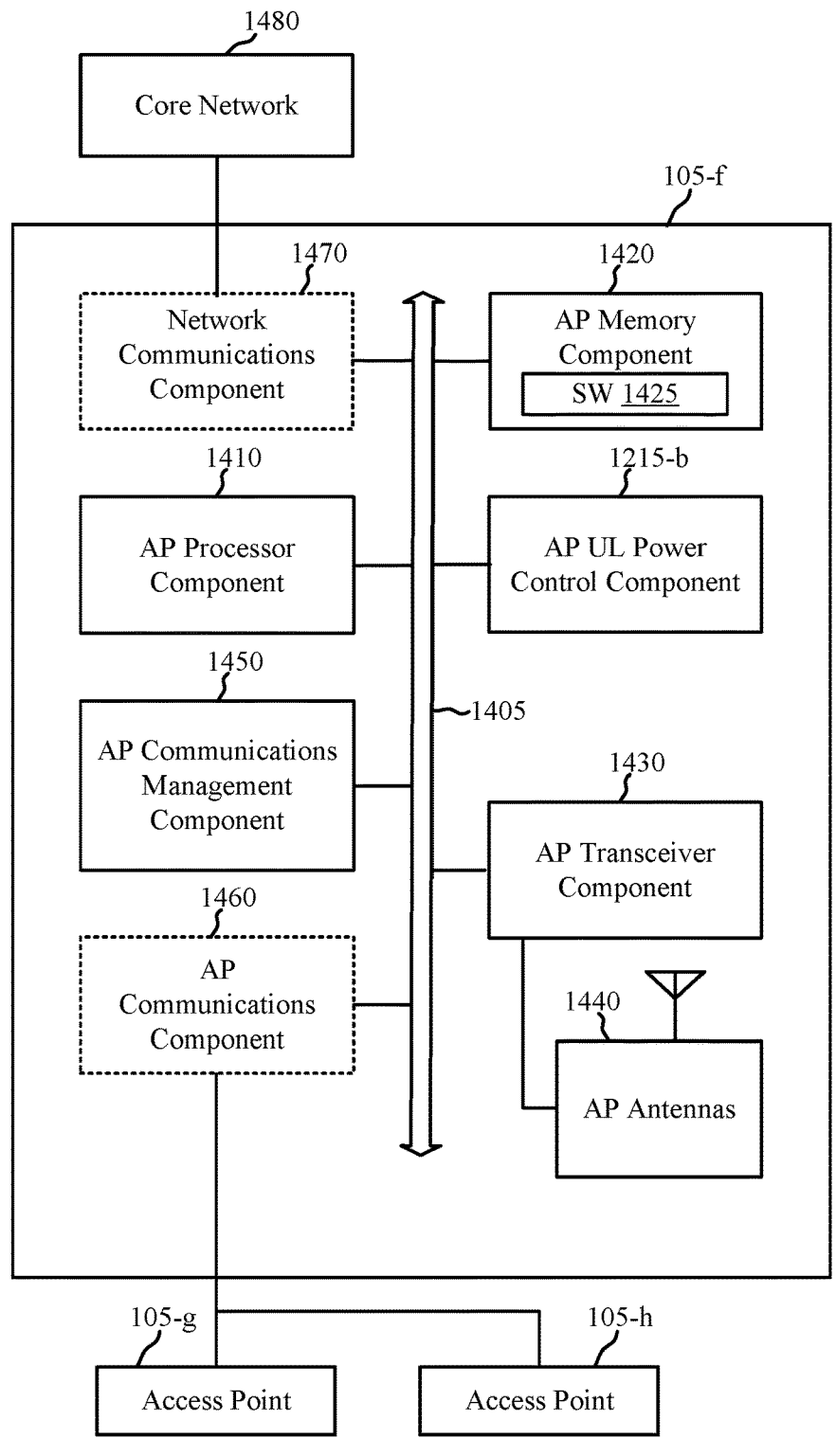
FIG. 14 shows a block diagram of a wireless communication system, in accordance with various aspects of the present disclosure.

Turning to FIG. 14, a diagram 1400 is shown that illustrates an AP 105-f configured for providing UL power control to wireless stations in a MU environment. In some aspects, the AP 105-f may be an example of the APs 105 of FIGS. 1, 2A-2D, 4A, 6A, 9A-9D, 10A, and 10B or the device 1205 of FIGS. 12 and 13. The AP 105-f may include an AP processor component 1410, an AP memory component 1420, an AP transceiver component 1430, AP antennas 1440, and an AP UL power control component 1215-b. The AP UL power control component 1215-b may be an example of the AP UL power control components 1215 of FIGS. 12 and 13. In some examples, the AP 105-f may also include one or both of an AP communications component 1460 and a network communications component 1470. Each of these components may be in communication with each other, directly or indirectly, over at least one bus 1405.

The AP memory component 1420 may include random access memory (RAM) and read-only memory (ROM). The AP memory component 1420 may also store computer-readable, computer-executable software (SW) code 1425 containing instructions that are configured to, when executed, cause the AP processor component 1410 to perform various functions described herein for regulating UL transmission power control from multiple wireless stations, for example. Alternatively, the software code 1425 may not be directly executable by the AP processor component 1410 but be configured to cause the computer, e.g., when compiled and executed, to perform functions described herein.

The AP processor component 1410 may include an intelligent hardware device, e.g., a central processing unit (CPU), a microcontroller, an ASIC, etc. The AP processor component 1410 may process information received through the AP transceiver component 1430, the AP communications component 1460, and/or the network communications component 1470. The AP processor component 1410 may also process information to be sent to the AP transceiver component 1430 for transmission through the AP antennas 1440, to the AP communications component 1460, and/or to the network communications component 1470. The AP processor component 1410 may handle, alone or in connection with the AP UL power control component 1215-b, various aspects related to UL transmission power control.

The AP transceiver component 1430 may include a modem configured to modulate the packets and provide the modulated packets to the AP antennas 1440 for transmission, and to demodulate packets received from the AP antennas 1440. The AP transceiver component 1430 may be implemented as at least one transmitter component and at least one separate receiver component. The AP transceiver component 1430 may be configured to communicate bi-directionally, via the AP antennas 1440, with at least one wireless station 110 as illustrated in FIGS. 1, 2A-2D, 4A, 6A, 9A-9D, 10A, and 10B, for example. The AP 105-f may typically include multiple AP antennas 1440 (e.g., an antenna array). The AP 105-f may communicate with a core network 1480 through the network communications component 1470. The AP 105-f may communicate with other APs, such as the AP 105-g and the AP 105-h, using an AP communications component 1460.

According to the architecture of FIG. 14, the AP 105-f may further include an AP communications management component 1450. The AP communications management component 1450 may manage communications with stations and/or other devices as illustrated in the WLAN network 100 of FIG. 1. The AP communications management component 1450 may be in communication with some or all of the other components of the AP 105-f via the bus or buses 1405. Alternatively, functionality of the AP communications management component 1450 may be implemented as a component of the AP transceiver component 1430, as a computer program product, and/or as at least one controller element of the AP processor component 1410.

The components of the AP 105-f may be configured to implement aspects discussed above with respect to FIGS. 1-13, and those aspects may not be repeated here for the sake of brevity. Moreover, the components of the AP 105-f may be configured to implement aspects discussed below with respect to FIGS. 18 and 19, and those aspects may not be repeated here also for the sake of brevity.

Further, in one embodiment, components, for example, as shown in FIGS. 12-14, may each include a circuit or circuitry for accomplishing various UL power control regulation for multiple wireless stations in an MU wireless network. For example, the AP UL power control component 1215 may include circuit or circuitry for grouping wireless stations according to AP RX powers received at the device 1205, for determining target AP RX powers for UL transmissions from communicating wireless stations, for estimating path loss, for determining STA TX power, and for generating a power control parameter, which may be transmitted to one or more wireless stations via a CTX frame or a power control frame, for example.

Figure 15:
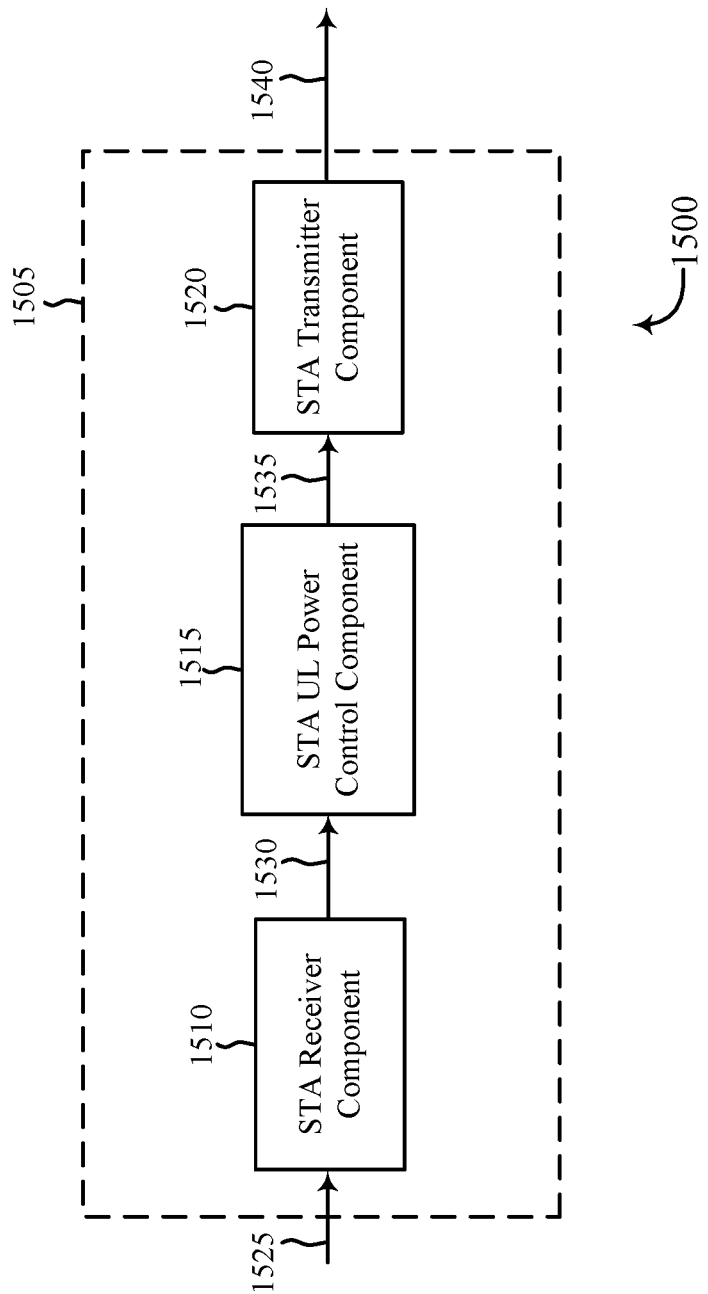
FIG. 15 shows a block diagram of an apparatus for use in wireless communication, in accordance with various aspects of the present disclosure.

FIG. 15 shows a block diagram 1500 of an apparatus 1505 for use in a station for wireless communication, in accordance with various aspects of the present disclosure. In some examples, the apparatus 1505 may be an example of aspects of one or more of the wireless stations 110 described with reference to FIGS. 1, 2A-2D, 4A, 6A, 9A-9D, 10A, and 10B. The apparatus 1505 may also be or include a processor (not shown). The apparatus 1505 may include a STA receiver component 1510, a STA UL power control component 1515, and/or a STA transmitter component 1520. Each of these components may be in communication with each other.

The apparatus 1505, through the STA receiver component 1510, the STA UL power control component 1515, and/or the STA transmitter component 1520, may be configured to perform functions described herein. For example, the apparatus 1505 may be configured to perform various UL transmission power control functions, including setting a STA TX power, determining UL and DL path loss and UL/DL path loss imbalance, and receiving and decoding CTX and power control frames that may include power control information.

The components of the apparatus 1505 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory, formatted to be executed by one or more general or application-specific processors. The functions of each component may also be implemented as circuits or in circuitry.

The STA receiver component 1510 may receive information such as packets, user data, and/or control information associated with various information channels (e.g., control channels, data channels, etc.). The STA receiver component 1510 may be configured to receive signals 1525 from an AP, for example, that may include UL transmission power control information. For example, the STA receiver component 1510 may receive CTX or power control frames including the power control information. The received information may be passed on to the STA UL power control component 1515 via signals 1530, and to other components of the apparatus 1505.

The STA UL power control component 1515 may receive the power control information contained in signals 1530 and use the information to set a STA TX power for UL transmissions. In addition, the STA UL power control component 1515 may be used to estimate UL and DL path loss, as well as to estimate UL/DL path loss imbalance. When communicating with an AP in order to provide path loss information, the STA UL power control component 1515 may also configure a UL transmission with a known TX power. The STA UL power control component 1515 may also measure the signal strengths of DL frames, for example. The power control information generated by the STA UL power control component 1515 may be conveyed to the STA transmitter component 1520 via signals 1535.

The STA transmitter component 1520 may receive power control information via signals 1535 and transmit the one or more signals received from other components of the apparatus 1505. The STA transmitter component 1520 may transmit various UL frames 1540 such as SU or MU data frames or other packets containing power-related information, as explained above. In some examples, the STA transmitter component 1520 may be collocated with the STA receiver component 1510 in a transceiver component. The STA transmitter component 1520 may include a single antenna, or it may include a plurality of antennas.

Figure 16:
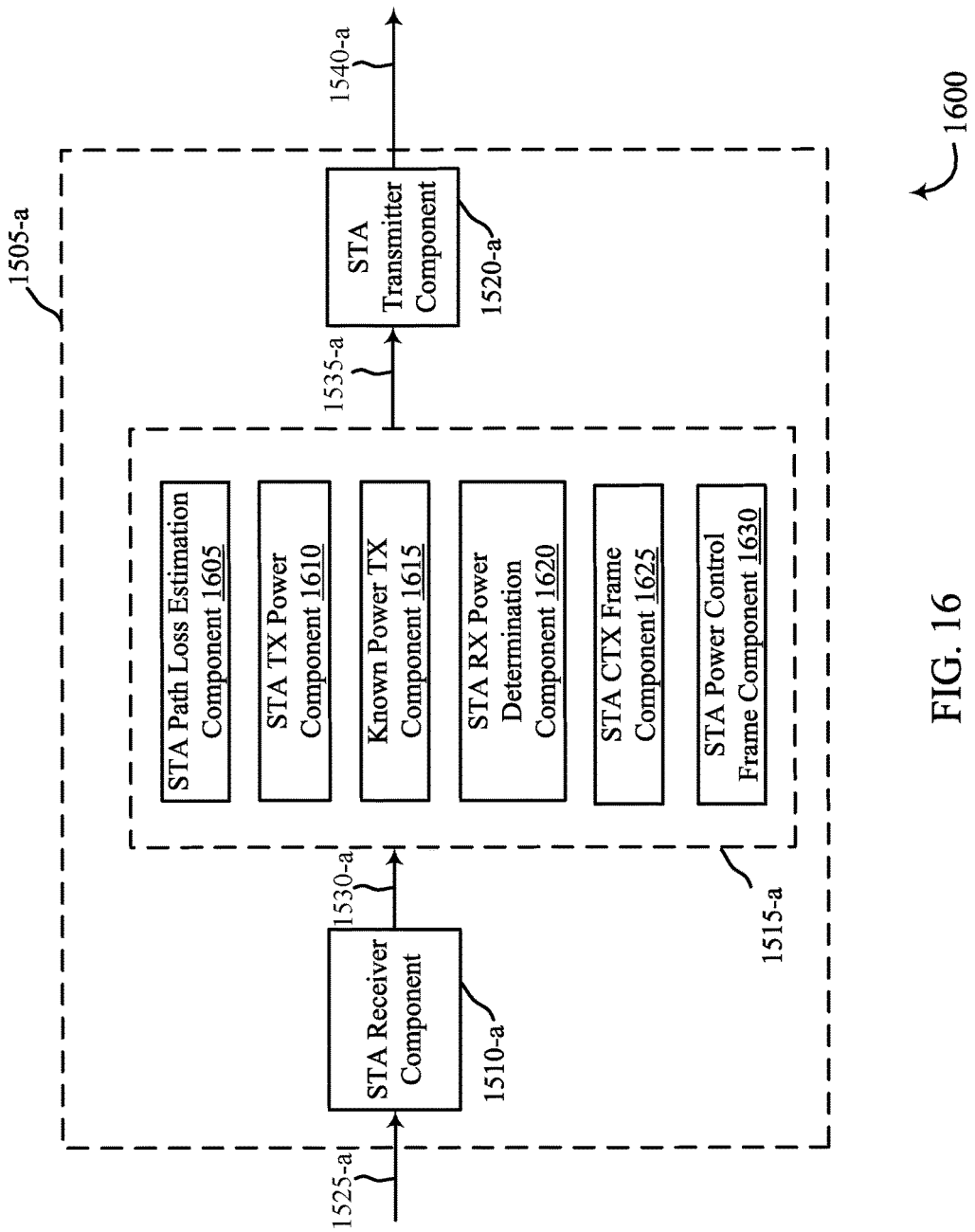
FIG. 16 shows a block diagram of an apparatus for use in wireless communication, in accordance with various aspects of the present disclosure.

FIG. 16 shows a block diagram 1600 of an apparatus 1505-a that is used in a wireless station for wireless communication, in accordance with various examples. The apparatus 1505-a may be an example of one or more aspects of a wireless station 110 described with reference to FIGS. 1, 2A-2D, 4A, 6A, 9A-9D, 10A, and 10B. It may also be an example of apparatus 1505 described with reference to FIG. 15. The apparatus 1505-a may include a STA receiver component 1510-a, a STA UL power control component 1515-a, and/or a STA transmitter component 1520-a, which may be examples of the corresponding components of apparatus 1505. The STA receiver component 1510-a may receive power control signals 1525-a in the form of CTX or power control frames, and may extract the power-related information and convey the power-related information to the STA UL power control component 1515-a via signals 1530-a. The STA UL power control component 1515-a may generate power control information and may transmit this information to the STA transmitter component 1520-a via signals 1535-a. The STA transmitter component 1520-a may transmit signals 1540-a that may include or be related to UL power control, as explained above. The apparatus 1505-a may also include a processor (not shown). Each of these components may be in communication with each other. The STA UL power control component 1515-a may include a STA path loss estimation component 1605, a STA TX power component 1610, a known power TX component 1615, a STA RX power determination component 1620, a STA CTX frame component 1625, and a STA power control frame component 1630. The STA receiver component 1510-a and the STA transmitter component 1520-a may perform the functions of the STA receiver component 1510 and the STA transmitter component 1520, of FIG. 15, respectively.

The STA path loss estimation component 1605 may be used by the apparatus 1505-a to determine a UL or a DL path loss, as well as a UL/DL path loss imbalance. The STA path loss estimation component 1605 may use knowledge of a STA RX and TX power in addition to an AP TX and RX power to determine path loss.

The determined UL path loss and UL/DL path loss imbalance may be used by the STA TX power component 1610 to determine an appropriate STA TX power. A STA TX power may also be determined by the receipt of a STA TX power already determined by an AP, or by the receipt of a target AP RX power. Further, the STA TX power may be determined after receipt of a power control parameter, which may be a component in a function F representing STA TX power.

The known power TX component 1615 may be used by the apparatus 1505-a to determine a STA TX power to be used in situations when an AP requires a transmission of a packet at a known TX power. The known power TX component 1615 may determine the known TX by reference to a standard or by the receipt of the known TX power from an AP. Alternatively, the known power TX component 1615 may determine its own TX power for a SU frame and then signal to the receiving AP the value of the TX power.

The STA RX power determination component 1620 may be used by the apparatus 1505-a to measure a STA RX power for DL frames received by the apparatus 1505-a. For example, an AP may transmit various DL frames to the apparatus 1505-a. Some of these may include CTX or power control frames that include a power control parameter which may be used by the apparatus 1505-a to determine a STA TX power. The determination of the STA TX power may also be made in consideration of received signal strengths of DL frames. For example, an RSSI may be measured to determine whether a STA TX power should be adjusted, as explained above.

The STA CTX frame component 1625 and the STA power control frame component 1630 may be used to receive and interpret power control information (such as power control parameters) that are embedded in either CTX or power control frames.

Figure 17:
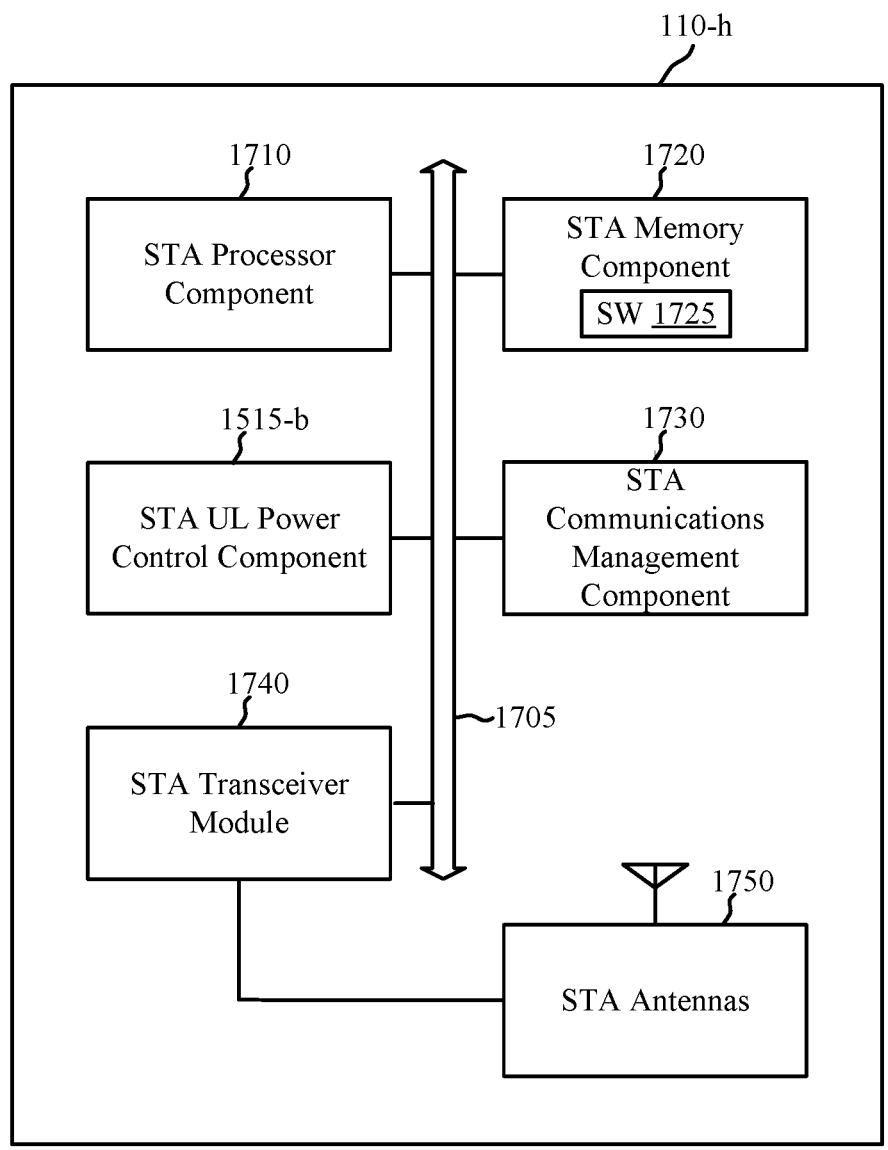
FIG. 17 shows a block diagram of a wireless station for use in wireless communication, in accordance with various aspects of the present disclosure.

Turning to FIG. 17, a diagram 1700 is shown that illustrates a wireless station 110-h configured for receiving and enabling UL transmission power control in an MU wireless network environment. The wireless station 110-h may have various other configurations and may be included or be part of a personal computer (e.g., laptop computer, netbook computer, tablet computer, etc.), a cellular telephone, a PDA, a digital video recorder (DVR), an internet appliance, a gaming console, an e-readers, etc. The wireless station 110-*h* may have an internal power supply (not shown), such as a small battery, to facilitate mobile operation. The wireless station 110-*h* may be an example of the wireless stations 110 of FIGS. 1, 2A-2D, 4A, 6A, 9A-9D, 10A, and 10B.

The wireless station 110-*h* may include a STA processor component 1710, a STA memory component 1720, a STA transceiver component 1740, STA antennas 1750, and a STA UL power control component 1515-*b*. The STA UL power control component 1515-*b* may be an example of the STA UL power control component 1515 of FIGS. 15 and 16. Each of these components may be in communication with each other, directly or indirectly, over at least one bus 1705.

The STA memory component 1720 may include RAM and ROM. The STA memory component 1720 may store computer-readable, computer-executable software (SW) code 1725 containing instructions that are configured to, when executed, cause the STA processor component 1710 to perform various functions described herein for implementing UL power control in response to AP DL frames. Alternatively, the software code 1725 may not be directly executable by the STA processor component 1710 but be configured to cause the computer (e.g., when compiled and executed) to perform functions described herein.

The STA processor component 1710 may include an intelligent hardware device, e.g., a CPU, a microcontroller, an ASIC, etc. The STA processor component 1710 may process information received through the STA transceiver component 1740 and/or to be sent to the STA transceiver component 1740 for transmission through the STA antennas 1750. The STA processor component 1710 may handle, alone or in connection with the STA UL power control component 1515-*b*, various aspects for UL transmission power control.

The STA transceiver component 1740 may be configured to communicate bi-directionally with APs 105 in FIGS. 1, 2A-2D, 4A, 6A, 9A-9D, 10A, and 10B. The STA transceiver component 1740 may be implemented as at least one transmitter component and at least one separate receiver component. The STA transceiver component 1740 may include a modem configured to modulate the packets and provide the modulated packets to the STA antennas 1750 for transmission, and to demodulate packets received from the STA antennas 1750. While the wireless station 110-*h* may include a single antenna, there may be aspects in which the wireless station 110-*h* may include multiple STA antennas 1750.

According to the architecture of FIG. 17, the wireless station 110-*h* may further include a STA communications management component 1730. The STA communications management component 1730 may manage communications with various APs. The STA communications management component 1730 may be a component of the wireless station 110-*h* in communication with some or all of the other components of the wireless station 110-*h* over the at least one bus 1705. Alternatively, functionality of the STA communications management component 1730 may be implemented as a component of the STA transceiver component 1740, as a computer program product, and/or as at least one controller element of the STA processor component 1710.

The components of the wireless station 110-*h* may be configured to implement aspects discussed above with respect to FIGS. 1-11, 15 and 16, and those aspects may not be repeated here for the sake of brevity. Moreover, the components of the wireless station 110-*h* may be configured to implement aspects discussed below with respect to FIGS. 18 and 19, and those aspects may not be repeated here also for the sake of brevity.

Further, in one embodiment, components, for example, as shown in FIGS. 15-17, may each include a circuit or circuitry for accomplishing various UL power control regulation for wireless stations in an MU wireless network. For example, the STA UL power control component 1515 may include circuit or circuitry for setting a STA TX power for UL transmissions, for estimating UL and DL path loss, for estimating UL/DL path loss imbalance, for providing path loss information to an AP, for configuring a UL transmission with a known TX power, and for measuring the signal strengths of DL frames, for example.

Figure 18:
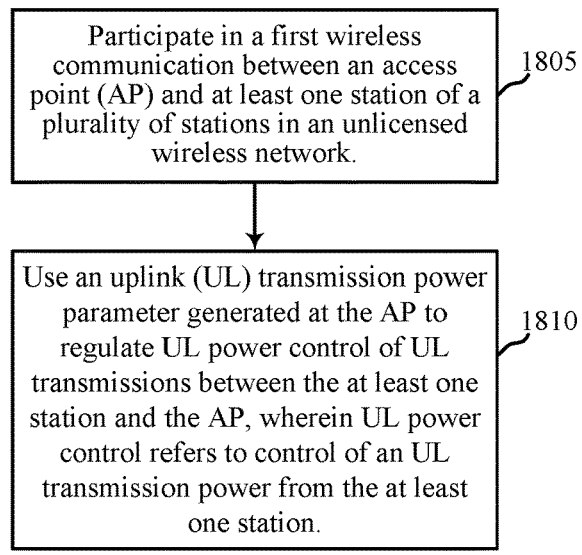
FIGS. 18 and 19 are flow charts illustrating examples of methods for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the APs or wireless stations described with reference to FIGS. 1, 2A-2D, 4A, 6A, 9A-9D, 10A, 10B, 14, and 17, and/or aspects of one or more of the devices or apparatuses described with reference to FIGS. 12, 13, 15, and 16. In some examples, either an AP or a wireless station may execute one or more sets of codes to control the functional elements of the AP or wireless station to perform the functions described below. Additionally or alternatively, the AP or wireless station may perform one or more of the functions described below using-purpose hardware.

At block 1805, the method 1800 may include participating in a first wireless communication between an AP and at least one station of a plurality of stations in an unlicensed wireless network. In some examples, the first wireless communication may be a probe communication. The operations at block 1805 may be performed using either the AP UL power control component 1215 or the STA UL power control component 1515 described with reference to FIGS. 12-17.

At block 1810, the method 1800 may include using an UL transmission power parameter generated by the AP to regulate UL power control of UL transmissions between the at least one station and the AP, wherein UL power control refers to control of an UL transmission power from the at least one station. In some circumstances the UL transmission power parameter may be the PC parameter described above. In some circumstances, the UL transmission power parameter may be determined, at least in part, based on information received during the first wireless communication. In some circumstances, the UL transmission power parameter may include the wireless station grouping determined by an AP based on AP RX powers of received transmissions from the wireless stations. The operations at block 1805 may be performed using either the AP UL power control component 1215 or the STA UL power control component 1515 described with reference to FIGS. 12-17.

Thus, the method 1800 may provide for wireless communication. It should be noted that the method 1800 is just one implementation and that the operations of the method 1800 may be rearranged or otherwise modified such that other implementations are possible.

Figure 19:
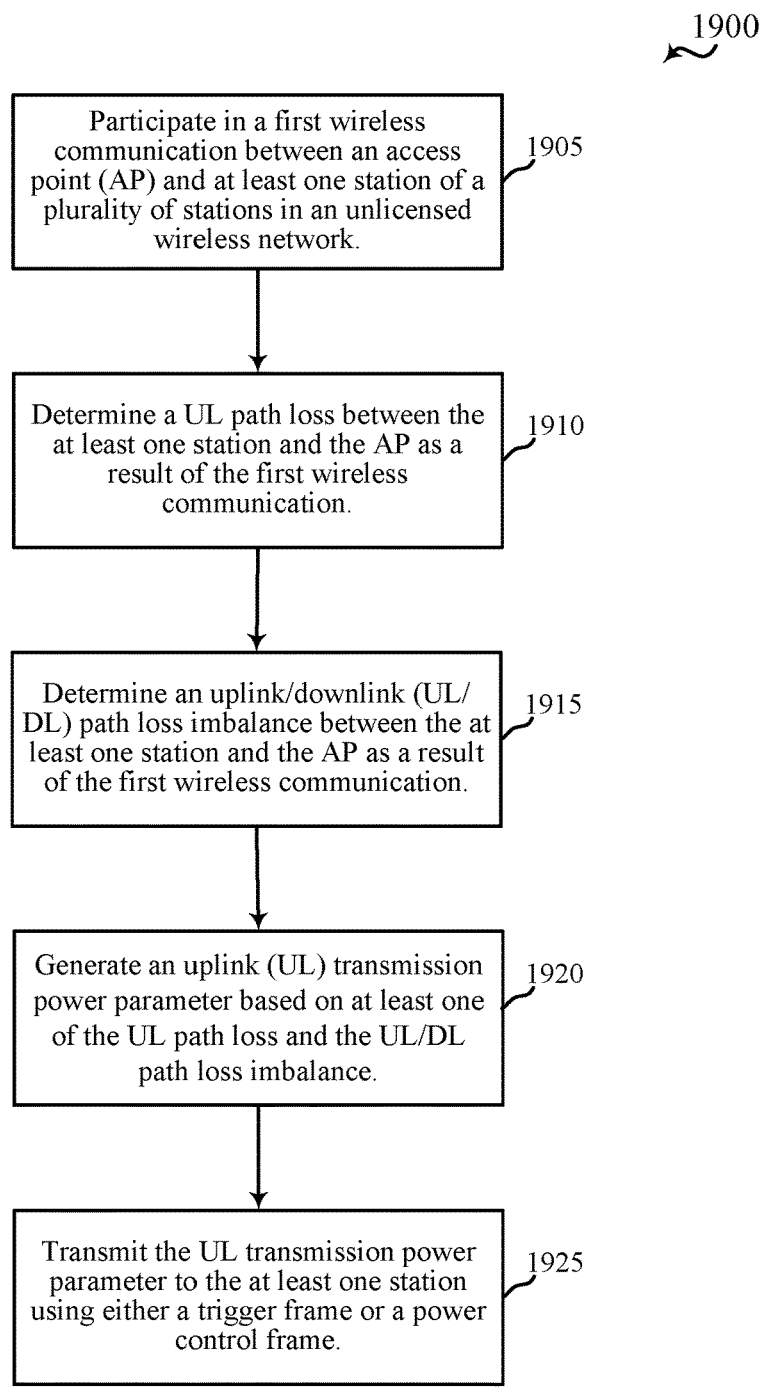

FIG. 19 is a flow chart illustrating an example of a method 1900 for wireless communication, in accordance with various aspects of the present disclosure. For clarity, the method 1900 is described below with reference to aspects of one or more of the APs described with reference to FIGS. 1, 2A-2D, 4A, 6A, 9A-9D, 10A, 10B, and 14, and/or aspects of one or more of the devices described with reference to FIGS. 12 and 13. In some examples, an AP may execute one or more sets of codes to control the functional elements of the AP to perform the functions described below. Additionally or alternatively, the AP may perform one or more of the functions described below using-purpose hardware.

At block 1905, the method 1900 includes participating in a first wireless communication between an AP and at least one station of a plurality of stations in an unlicensed wireless network. As explained above, the unlicensed wireless network may be an OFDMA or an MU MIMO wireless network.

At block 1910, the method 1900 may include determining a UL path loss between the at least one station and the AP as a result of the first wireless communication. The UL path loss may be determined by requesting that the at least one station transmit a packet at a known TX power, for example.

At block 1915, the method 1900 may include determining an uplink downlink (UL/DL) path loss imbalance between the at least one station and the AP as a result of the first wireless communication. In some examples, this may be accomplished by the AP determining the AP TX and RX powers and the STA RX and TX powers.

At block 1920, the method 1900 may include generating an UL transmission power parameter based on at least one of the UL path loss and the UL/DL path loss imbalance. The UL transmission power parameter may be an absolute STA TX power, a differential STA TX power amount, or a parameter that is a function F of a STA TX power. In some examples, the UL transmission power parameter is the PC parameter discussed above.

At block 1925, the method 1900 may include transmitting the UL transmission power parameter to the at least one station using either a trigger frame or a power control frame. The trigger frame may be a CTX frame, and the power control frame may be a control frame transmitted before a CTX or other trigger frame.

Thus, the method 1900 may provide for wireless communication. It should be noted that the method 1900 is just one implementation and that the operations of the method 1900 may be rearranged or otherwise modified such that other implementations are possible.

In some examples, aspects from two or more of the methods 1800, 1900 may be combined. It should be noted that the methods 1800 and 1900 are just example implementations, and that the operations of the methods 1800 and 1900 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. The various illustrative blocks and components described in connection with the disclosure herein may also be implemented as circuits or in circuitry.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication in an unlicensed wireless network, comprising:
    receiving a target access point (AP) receive power via a power control message, the power control message being transmitted from an AP to at least one station of a plurality of stations;
    determining a downlink (DL) path loss;
    estimating an uplink (UL) path loss from the at least one station to the AP based on the DL path loss;
    determining, based at least in part on the DL path loss, an UL transmission power for UL transmissions between the at least one station and the AP such that the UL transmissions arrive at the AP having the target AP receive power while accounting for UL path loss; and
    transmitting the UL transmissions using the UL transmission power.

2. The method of claim 1, further comprising:
    receiving an AP transmission power via the power control message;
    wherein the DL path loss is based at least in part on the AP transmission power.

3. The method of claim 1, wherein:
    the received target AP receive power is equivalent to target received powers received by each station of the plurality of stations.

4. The method of claim 1, wherein estimating the UL path loss comprises:
    estimating that the UL path loss is equal to the DL path loss.

5. The method of claim 1, further comprising:
    receiving the power control message in a trigger frame that triggers the UL transmissions between the at least one station and the AP.

6. The method of claim 1, further comprising:
    receiving the power control message in a power control frame that is separate from a trigger frame that triggers the UL transmissions between the at least one station and the AP.

7. The method of claim 1, wherein the wireless communication comprises:
    communicating in an orthogonal frequency-division multiple access (OFDMA) or multi-user (MU) multiple-input and multiple-output (MIMO) environment.

8. The method of claim 1, further comprising:
    sending a transmission from the at least one station to the AP, the transmission having a known power at which the transmission was sent from the at least one station or indicating a power at which the transmission was sent from the at least one station.

9. The method of claim 8, wherein sending the transmission comprises:
    sending the transmission periodically.

10. The method of claim 8, wherein sending the transmission comprises:
    sending the transmission when an estimated beacon received signal strength indication (RSSI) changes more than a predetermined threshold amount with respect to a previous transmission between the at least one station and the AP.

11. The method of claim 8, wherein sending the transmission comprises:
    sending the transmission in response to a request by the AP.

12. The method of claim 1, wherein the unlicensed wireless network comprises a Wi-Fi system.

13. An apparatus for wireless communication in an unlicensed wireless network, comprising:
    a receiver component for receiving a target access point (AP) receive power and an AP transmission power via a power control message, the power control message being transmitted from an AP to at least one station of a plurality of stations;
    a path loss estimation component for:
        determining a downlink (DL) path loss based on the AP transmission power;
        estimating an uplink (UL) path loss from the at least one station to the AP based on the DL path loss;
    a transmission power component for determining, based at least in part on the DL path loss, an UL transmission power for UL transmissions between the at least one station and the AP such that the UL transmissions arrive at the AP having the target AP receive power while accounting for UL path loss; and
    a transmitter component for transmitting the UL transmissions using the UL transmission power.

14. The apparatus of claim 13, wherein the receiver component is further configured for:
    receiving an AP transmission power via the power control message;
    wherein the DL path loss is based at least in part on the AP transmission power.

15. The apparatus of claim 13, wherein:
    the received target AP receive power is equivalent to target received powers received by each station of the plurality of stations.

16. The apparatus of claim 13, wherein estimating the UL path loss comprises:
    estimating that the UL path loss is equal to the DL path loss.

17. The apparatus of claim 13, wherein the receiver component is further configured for:
    receiving the power control message in a trigger frame that triggers the UL transmissions between the at least one station and the AP.

18. The apparatus of claim 13, wherein the receiver component is further configured for:
    receiving the power control message in a power control frame that is separate from a trigger frame that triggers the UL transmissions between the at least one station and the AP.

19. The apparatus of claim 13, wherein the wireless communication comprises:
    communicating in an orthogonal frequency-division multiple access (OFDMA) or multi-user (MU) multiple-input and multiple-output (MIMO) environment.

20. The apparatus of claim 13, wherein the transmitter component is further configured for:
sending a transmission from the at least one station to the AP, the transmission having a known power at which the transmission was sent from the at least one station or indicating a power at which the transmission was sent from the at least one station.

21. The apparatus of claim 20, wherein sending the transmission comprises:
sending the transmission periodically.

22. The apparatus of claim 20, wherein sending the transmission comprises:
sending the transmission when an estimated beacon received signal strength indication (RSSI) changes more than a predetermined threshold amount with respect to a previous transmission between the at least one station and the AP.

23. The apparatus of claim 20, wherein sending the transmission comprises:
sending the transmission in response to a request by the AP.

24. The apparatus of claim 13, wherein the unlicensed wireless network comprises a Wi-Fi system.

25. An apparatus for wireless communication in an unlicensed wireless network, comprising:
means for receiving a target access point (AP) receive power and an AP transmission power via a power control message, the power control message being transmitted from an AP to at least one station of a plurality of stations;
means for determining a downlink (DL) path loss based on the AP transmission power;
means for estimating an uplink (UL) path loss from the at least one station to the AP based on the DL path loss;
means for determining, based at least in part on the DL path loss, an UL transmission power for UL transmissions between the at least one station and the AP such that the UL transmissions arrive at the AP having the target AP receive power while accounting for UL path loss; and
means for transmitting the UL transmissions using the UL transmission power.

26. The apparatus of claim 25, further comprising:
means for receiving an AP transmission power via the power control message;
wherein the DL path loss is based at least in part on the AP transmission power.

27. The apparatus of claim 25, wherein:
the received target AP receive power is equivalent to target received powers received by each station of the plurality of stations.

28. The apparatus of claim 25, wherein the means for estimating the UL path loss comprises:
means for estimating that the UL path loss is equal to the DL path loss.

29. The apparatus of claim 25, further comprising:
means for sending a transmission from the at least one station to the AP, the transmission having a known power at which the transmission was sent from the at least one station or indicating a power at which the transmission was sent from the at least one station.

30. A non-transitory computer-readable medium storing computer-executable code for wireless communication in an unlicensed wireless network, the code executable by a processor to:
receive a target access point (AP) receive power and an AP transmission power via a power control message, the power control message being transmitted from an AP to at least one station of a plurality of stations;
determine a downlink (DL) path loss based on the AP transmission power;
estimate an uplink (UL) path loss from the at least one station to the AP based on the DL path loss;
determine, based at least in part on the DL path loss, an UL transmission power for UL transmissions between the at least one station and the AP such that the UL transmissions arrive at the AP having the target AP receive power while accounting for UL path loss; and
transmit the UL transmissions using the UL transmission power.

* * * * *